(12) United States Patent
Koyama et al.

(10) Patent No.: US 7,865,130 B2
(45) Date of Patent: Jan. 4, 2011

(54) MATERIAL PROCESSING APPARATUS, MATERIAL PROCESSING METHOD, AND MATERIAL PROCESSING PROGRAM PRODUCT

(75) Inventors: Toshiya Koyama, Kanagawa (JP); Nobuhiro Nozaki, Tokyo (JP); Ichiro Shimomura, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 695 days.

(21) Appl. No.: 11/225,131

(22) Filed: Sep. 14, 2005

(65) Prior Publication Data
US 2006/0188863 A1 Aug. 24, 2006

(30) Foreign Application Priority Data

Feb. 23, 2005 (JP) ............................. 2005-046509
Feb. 28, 2005 (JP) ............................. 2005-052479

(51) Int. Cl.
*G09B 3/00* (2006.01)
(52) U.S. Cl. ..................... 434/350; 434/362; 434/323
(58) Field of Classification Search ............... 434/353, 434/362
See application file for complete search history.

(56) References Cited

U.S. PATENT DOCUMENTS 5,568,565 A * 10/1996 Minakata .................. 382/187
6,600,482 B1 * 7/2003 Leone et al. ............... 345/179
2004/0026493 A1 * 2/2004 Constantine ............... 235/375
2004/0034835 A1 * 2/2004 Kuruoglu et al. ........... 715/530
2004/0264811 A1 12/2004 Yano et al.

FOREIGN PATENT DOCUMENTS

| JP | A-6-60177 | 3/1994 |
| JP | A 06-266278 | 9/1994 |
| JP | A-9-311621 | 12/1997 |
| JP | A-2005-18603 | 1/2005 |
| JP | A-2005-24693 | 1/2005 |

OTHER PUBLICATIONS

Office Action issued in Japanese Patent Application No. 2005-046509 on Jun. 1, 2010.

* cited by examiner

*Primary Examiner*—Xuan M Thai
*Assistant Examiner*—Evan R Page
(74) *Attorney, Agent, or Firm*—Oliff & Berridge, PLC

(57) ABSTRACT

A material processing method has a process of reading image data of a material. The material has answer fields and information items on points distributed to the answer fields. The method also has extracting the distributed point information items based on the image data, associating the distributed point information items with answer fields to recognize the points distributed to each answer field, storing a result recognized the points distributed to each answer field as answer/distributed point correspondence information, recognizing correct/incorrect answer determining contents from the image data, and performing point totaling on the correct/incorrect answer determining contents based on the answer/distributed point correspondence information.

24 Claims, 15 Drawing Sheets

| QUESTION NUMBER | POINTS DISTRIBUTED TO QUESTION | X | Y | W | H |
|---|---|---|---|---|---|
| 1 | 5 | 200 | 500 | 240 | 120 |
| 2 | 10 | 450 | 500 | 300 | 120 |
| 3 | 5 | 800 | 300 | 240 | 120 |
| N | 10 | 1000 | 1700 | 360 | 240 |

EXTRACTED 'O' AND 'X' IMAGES      BINARIZED IMAGES

FIG. 14

| QUESTION NUMBER | ○ × | POINTS OBTAINED |
|---|---|---|
| 1 | ○ | 5 |
| 2 | ○ | 10 |
| 3 | × | 0 |
|  |  |  |
| N | ○ | 10 |

MATERIAL PROCESSING APPARATUS, MATERIAL PROCESSING METHOD, AND MATERIAL PROCESSING PROGRAM PRODUCT

BACKGROUND OF THE INVENTION

1. Field of the Invention

The present invention relates to a teaching material processing apparatus, a teaching material processing method, and a teaching material processing program that processes an educational material used in an educational institute, and more particularly, to a teaching material processing apparatus, a teaching material processing method, and a teaching material processing program capable of performing marking on an educational material.

2. Background Art

In general, for example, an educational material, such as a paper test or an exercise sheep, is used in an educational institute, such as a school. That is, a student enters answers in answer fields corresponding to the answers on the educational material, and then a teacher marks the educational material having the answers entered therein.

Therefore, an easy marking process on the educational material has been strongly demanded. To meet the demand for the easy marking process, for example, a system has been proposed in which a marking table and a marking pen are connected to a personal computer (hereinafter, referred to as a 'PC'), and symbols 'O' and 'x' are entered in the educational material loaded at a predetermined position on the marking table by using the marking pen to input position information of the answers entered on the educational material and correct/incorrect answer information to the PC, thereby performing automatic marking on the answers entered in the educational material by using the PC (for example, see JP-A-6-266278.).

However, in the marking process of the educational material, it is not necessarily preferable that dedicated components, such as the marking table and the marking pen, be provided. The reason is that the dedicated components cause the overall structure of a system to be complicated and an increase in manufacturing costs thereof. In addition, when the dedicated components are used, the educational material which can correspond thereto is limited, which causes generality for the educational material to be deteriorated.

In recent years, a PC, a duplicating machine, or a multifunction machine having a scanning function, a printing function, and a network communication function has been generally provided in the educational institutes.

Therefore, in the marking process of the educational material, a reading process is performed on an educational material having correct/incorrect answer determining figures, such as 'O' and 'x', entered therein by using the scanning function of, for example, a duplicating machine, and image processing is performed on image data, which is the read result, by using the image processing function of, for example, a PC. In this way, it is possible to automatically mark answers entered in the educational material, without using specific components. More specifically, when the image data is acquired from the educational material, correct/incorrect answer determining contents are extracted from the image data to perform point totaling on the correct/incorrect answer determining contents entered in the educational material. In addition, the contents entered in the educational material by an answerer are extracted from the image data, and the specification of the answerer is performed by using an OCR (optical character reader) technique to associate the point totaled result with the answerer specification result, thereby automatically obtaining the same marked result as that disclosed in the above-mentioned patent publication.

Therefore, in the above-mentioned marking process of the educational material, the correct/incorrect answer determining contents should be extracted, and the distribution of points for the correct/incorrect answer determination, that is, points distributed to questions should be recognized. When the points distributed to each question is not known, the point totaling cannot be performed. Therefore, in order to perform the point totaling on the educational material, information for specifying points distributed to each question (hereinafter, referred to as 'distributed point information') is needed. That is, in the marking process of the educational material, it is necessary to prepare the distributed point information on each answer field on the educational material.

However, in general, a plurality of questions and answer fields corresponding thereto are arranged on the educational material, and points distributed to the questions are different from each other. In addition, various types of entry fields exist on the educational field according to subjects or grades of students.

Therefore, when the distributed point information is manually input to a system or apparatus for performing a marking process by a user for the system or apparatus, the structure of the system or apparatus becomes very complicated, and operational errors can easily occur. Thus, this method is not preferable.

SUMMARY OF THE INVENTION

Accordingly, the invention is designed to address the above-mentioned problems, and provides a material processing apparatus, a processing method, and a processing program capable of automatically performing point totaling on correct/incorrect answer determining contents entered in an material while saving trouble in manually inputting distributed point information, thereby easily performing a marking process.

BRIEF DESCRIPTION OF THE DRAWINGS

The present invention may be more readily described with reference to the accompanying drawings:

FIG. 2 is a diagram illustrating an example of an educational material.

FIG. 8 is a diagram illustrating an example of the answer/distributed point correspondence information.

FIG. 14 is a diagram illustrating an example of a mark result per question.

DETAILED DESCRIPTION OF THE EMBODIMENTS

Hereinafter, a teaching material processing apparatus, a teaching material processing method, and a teaching material processing program according to the invention will be described with reference to the accompanying drawings.

Figure 1:
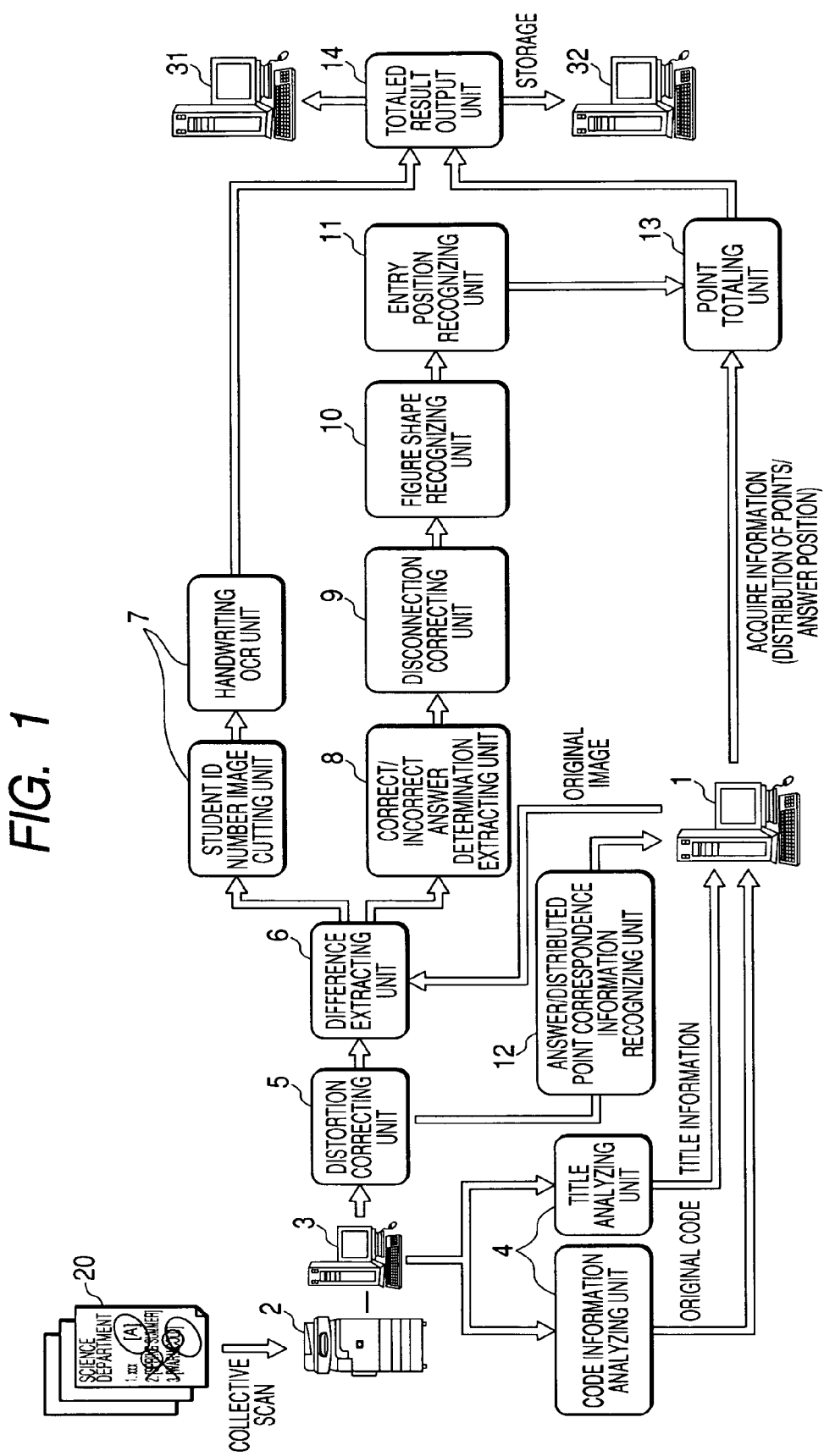
FIG. 1 is a block diagram illustrating the schematic structure of a teaching material processing apparatus according to the invention.

First, the schematic structure of the teaching material processing apparatus will be described. FIG. 1 is a block diagram illustrating the schematic structure of the teaching material processing apparatus according to the invention.

As shown in FIG. 1, the teaching material processing apparatus according to the invention includes a database 1, an image reading unit 2, an image data analyzing unit 3, a teaching material discriminating unit 4, a distortion correcting unit 5, a difference extracting unit 6, an answerer extracting unit 7, a correct/incorrect answer determination extracting unit 8, a disconnection correcting unit 9, a figure shape recognizing unit 10, an entry position recognizing unit 11, an answer/distributed point correspondence information recognizing unit 12, a point totaling unit 13, and a totaled result output unit 14.

The database 1 stores electronic data for educational materials. In addition, answer/distributed point correspondence information, which will be described later, is stored in the database 1 in a state in which it is associated with the educational materials storing the electronic data. That is, the database 1 functions as a storage unit of the invention.

Figure 2:
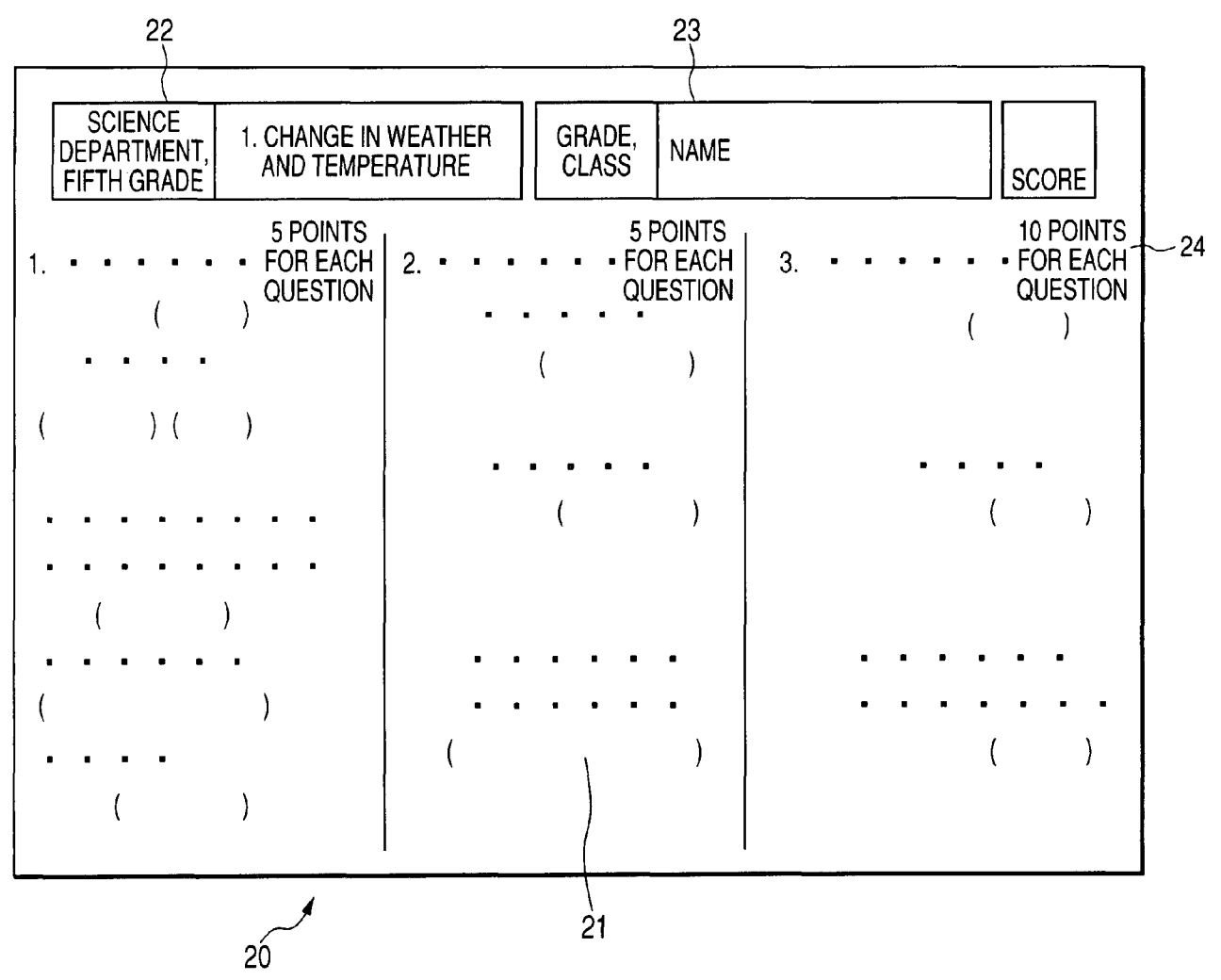

Here, the educational materials will be described simply. FIG. 2 is a diagram illustrating an example of the educational materials. As shown in FIG. 2, an educational material 20 has examination questions and answer fields 21. More specifically, a paper test or exercise sheet used in an educational institution corresponds to the educational material. However, the educational material 20 may have at least the answer fields 21, but may not necessarily have the questions.

Further, the educational material 20 includes an identification information field 22 for discriminating the educational material and an answerer information field 23 related to the answerer who enters answers in the answer fields 21. For example, the subject, title, and grade of the educational material are entered in the identification information field 22. Alternatively, code information for discriminating the educational material 20 will be entered in the identification information field 22 in addition to or separately from the above-mentioned entry items. The code information may be entered therein by using a well-known technique, such as 'iTone (registered trademark)' which embeds digital information in a halftone image by changing the forms (for example, position and shape) of pixels constituting a dot screen or a line screen for performing gray-scale display. In addition, for example, the class, student ID number, and name of the answerer are entered in the answerer information field 23.

Furthermore, the educational material 20 has distributed point information items 24 for the answer fields 21. Each distributed point information item 24 is an information item specifying the points distributed to the corresponding answer field 21, and is composed of a 'figure' and letters 'points' corresponding to the distribution of points. That is, the distributed point information items 24 are information items for specifying what points are distributed in the respective answer fields 21 on the educational material. However, the distribution of points is not limited to the combination of characters 'figure' and 'points' as long as the distribution of points can be specified, but it may be composed of, for example, predetermined code information. In addition, the distributed point information items 24 may be arranged so as to separately correspond to the answer fields 21 of the educational material 20, or may be arranged so as to correspond to some answer fields 21 having the same distribution of points. In both cases, the distributed point information items 24 are arranged to have predetermined regularity in the vicinities of the answer fields 21 (for example, the information items are arranged in the vicinities of the ends of the questions) such that a clear correspondence is made between the distributed point information items 24 and the answer fields 21 whose distribution of points is specified by the distributed point information items 24.

The electronic data for the educational material 20 is obtained by specifying the answer fields 21, the identification information field 22, and the distributed point information items 24, or the layout of them. In addition, the electronic data may have any format as long as they can be stored in the database 1. For example, the electronic data may be image data or application text data created by a word processor.

In FIG. 1, the image reading unit 2 performs an optical reading process, by using a well-known optical image reading technique, on the educational material 20 in which the answers and the name of the answerer have been respectively entered in the answer fields 21 and the answerer information field 23, and the correct or incorrect answer determination (specifically, for example, a figure 'O' or 'x') has been performed on the answers, thereby obtaining image data from the educational material 20. That is, the image reading unit 2 functions as a reading unit of the invention.

The image data analyzing unit 3 performs an analyzing process on the image data obtained by the image reading unit 2. The analyzing process includes, for example, layout analysis, separation of letters and figures, letter recognition, code information recognition, figure processing, and color component recognition, and these processes can be performed by a well-known image processing technique. Therefore, a detailed description thereof will be omitted.

The teaching material discriminating unit 4 is composed of at least one of a title analyzing unit and a code information analyzing unit, and discriminates and specifies an educational material composed of the image data obtained by the image reading unit 2, on the basis of the analysis results by the image data analyzing unit 3, specifically, at least one of the code analysis results of the code information analyzing unit on the identification information field 22 and the title analysis results of the title analyzing unit thereon. In this case, the database 1 checks the educational material holding and storing the electronic data. As a result, when the corresponding electronic data is stored in the database 1, the teaching material discriminating unit 4 determines that the educational material has a discrimination specification error. That is, the teaching material discriminating unit 4 specifies the electronic data, which is a target to be compared with the image data obtained by the image reading unit 2, from the analysis results by the image data analyzing unit 3.

The distortion correcting unit 5 corrects the image distortion of the image data obtained by the image reading unit 2. The correction of the image distortion includes inclination correction and enlargement/reduction correction of a main scanning direction or sub-scanning direction. Both the correction methods can be performed by a well-known image processing technique, and thus a detailed description thereof will be omitted.

The difference extracting unit 6 compares the image data obtained by the image reading unit 2, whose image distortion has been corrected by the distortion correcting unit 5, with the electronic data stored in the database 1, on the basis of the discrimination specification result of the educational material by the teaching material discriminating unit 4, and extracts the different between the image data and the electronic data. In addition, the difference extracting process may be performed by using a well-known image processing technique, and thus a detailed description thereof will be omitted.

The answerer extracting unit 7 is composed of at least one of a student ID number information cutting unit and a handwriting OCR (optical character reader) unit, preferably both of them. Therefore, the answerer extracting unit 7 extracts answerer information from the educational material, which is a target to be read out by the image reading unit 2, through a character information extraction process by the student ID number information cutting unit from the difference corresponding to the answerer information field 23 among the differences extracted by the difference extracting unit 6 or a character recognition process by the handwriting OCR unit therefrom. The answerer information for discriminating the answerer includes, for example, the class, student ID number, and name of the answerer. That is, the answerer extracting unit 7 functions as an answerer extracting means of the invention.

The correct/incorrect answer determination extracting unit 8 extracts the entered correct or incorrect answer determining content from the difference extracted by the difference extracting unit 6, on the basis of the analysis results obtained by the image data analyzing unit 3. The extraction of the correct or incorrect answer determining content may be performed by extracting a predetermined color component, for example, through a color component recognition process corresponding to the extraction result obtained by the difference extracting unit 6. In general, the entry of the correct or incorrect answer is performed in red.

The disconnection correcting unit 9 performs a cut-off correcting process on the extraction result obtained by the correct/incorrect answer determination extracting unit 8. The disconnection correcting process is performed for connecting extracted line segments to resolve the problem of disconnection between the extracted line segments.

The figure shape recognizing unit 10 performs a shape recognizing process on the entered content determined as the correct or incorrect answer which has been extracted by the correct/incorrect answer determination extracting unit 8 and then has been subjected to the disconnection correction by the disconnection correcting unit 9 to recognize the entered content determined as the correct or incorrect answer. The shape recognition may be performed by pattern matching with the figure '○' or 'x'. That is, the figure shape recognizing unit 10 recognizes whether the entered correct/incorrect answer content is a 'correct answer (○)' or 'an incorrect answer (x)'.

Further, the entry position recognizing unit 11 recognizes the entry position of the correct/incorrect answer whose shape is recognized by the figure shape recognizing unit 10 on the educational material. For example, the recognition of the entry position may be performed by analyzing coordinates on the educational material.

That is, the figure shape recognizing unit 10 and the entry position recognizing unit 11 serve as a correct/incorrect answer determination recognizing means of the invention.

The answer/distributed point correspondence information recognizing unit 12 recognizes the points distributed to the answer field 21 by extracting the distributed point information item 24 included in the educational material 20 from the image data which has been obtained from the image reading unit 2 and then has been subjected to the image distortion correction by the distortion correcting unit 5, by extracting the position information of the answer field 21 included in the educational material 20, and then by associating the extracted distributed point information item 24 with the extracted position information, and then stores the recognized result in the database 1 as answer/distributed point correspondence information. That is, the answer/distributed point correspondence information recognizing unit 12 recognizes what points are distributed to the respective answer fields 21 on the educational material 20. In addition, the answer/distributed point correspondence information recognizing unit 12 will be described later in detail.

The point totaling unit 13 performs point totaling on the correct/incorrect answer determining contents entered in the educational material 20, on the basis of the recognition result of the correct/incorrect answer determining contents obtained by the figure shape recognizing unit 10, the recognition result of the entry positions of the correct/incorrect answer determining contents obtained by the entry position recognizing unit 11, and the answer/distributed point correspondence information stored in the database 1. That is, the point totaling unit 13 functions as a point totaling means of the invention.

The totaled result output unit 14 associates the point totaled result obtained by the point totaling unit 13 with the answerer information extracted by the answerer extracting unit 7 to output it. In addition, the output of the totaled result output unit 14 may be transmitted to a database apparatus 31 or a file server apparatus 32 which is connected to the teaching material processing apparatus to manage the point totaled result for the educational material 20.

Further, among the above-mentioned units 1 to 14, the image reading unit 2 may be realized by using a duplicating machine, a multifunction machine, or a scanner apparatus having the function of an image reading device. In this case, when an automatic document feeder (ADF) is provided, it is possible to continuously perform image reading on a plurality of educational materials.

Furthermore, the units 1 and 3 to 14 other than the image reading unit 2 may be realized by a computer, such as a personal computer, by making the computer execute predetermined programs to perform, for example, an information storing/processing function, an image processing function, and a calculation processing function. In this case, it is considered that predetermined programs required for realizing the units 1 and 3 to 14 are previously installed in the PC. However, the programs may be provided in a state in which they are stored in computer readable media, or they may be distributed through a communication means by wire or wireless, without previously being installed in the PC. That is, the teaching material processing apparatus having the above-mentioned structure can also be realized by a teaching material processing program which allows a computer connected to the image reading apparatus to function as a teaching material processing apparatus.

Figure 3:
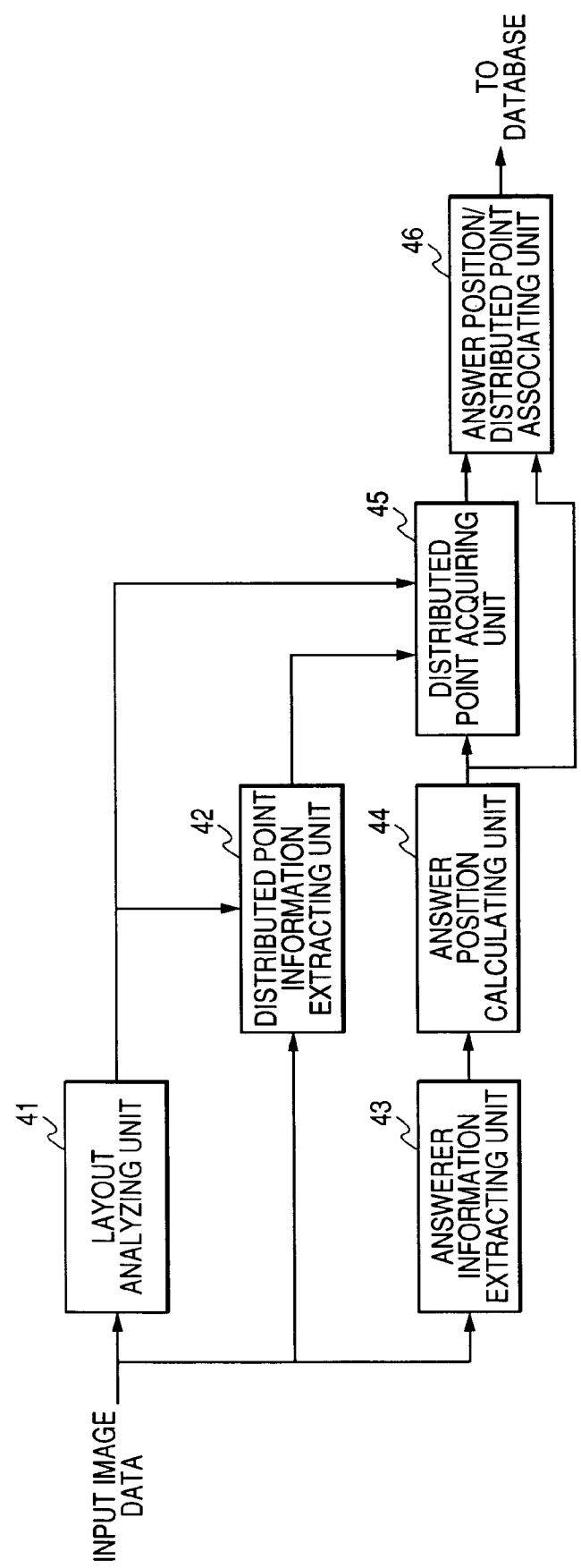
FIG. 3 is a block diagram illustrating the functional structure of an answer/distributed point correspondence information recognizing unit of the teaching material processing apparatus according to the invention.

Hereinafter, the answer/distributed point correspondence information recognizing unit 12 among the above-described units 1 to 14 will be described in detail. FIG. 3 is a block diagram illustrating the functional structure of the answer/distributed point correspondence information recognizing unit. As shown in FIG. 3, the answer/distributed point correspondence information recognizing unit 12 includes a layout analyzing unit 41, a distributed point information extracting unit 42, an answer field information extracting unit 43, an answer position calculating unit 44, a distributed point acquiring unit 45, and an answer position/distributed point associating unit 46.

The layout analyzing unit 41 performs layout analysis on the image data which has been obtained from the image reading unit 2 and then has been subjected to the image distortion correction by the distortion correcting unit 5. More specifically, the layout analyzing unit 41 analyzes the layout of the educational material 20, such as 'multi-columns', to recognize the arrangement structure of, for example, the respective answer fields 21 or the distributed point information item 24. Then, the layout analyzing unit 41 notifies the analyzed result of the distributed point information extracting unit 42 and the distributed point acquiring unit 45. That is, the layout analyzing unit 41 functions as a layout analyzing means of the invention.

The distributed point information extracting unit 42 extracts all distributed point information items 24 on the educational material 20, on the basis of the image data which has been obtained from the image reading unit 2 and then has been subjected to the image distortion correction by the distortion correcting unit 5. It is considered that the extraction of the distributed point information items 24 is performed by extracting a combination of characters 'figure' and 'points' by means of character recognition. That is, the distributed point information extracting unit 42 functions as a distributed point information extracting unit of the invention.

The answer field information extracting unit 43 performs region recognition and extraction on all answer fields 21 on the educational material 20, on the basis of the image data which has been obtained from the image reading unit 2 and then has been subjected to the image distortion correction by the distortion correcting unit 5. More specifically, for example, it is considered that the answer field information extracting unit 43 extracts a symbol having a predetermined shape, such as '( )' or '[ ]' by using the character extraction, and recognizes a region specified from a circumscribed rectangle including the symbol as the answer field 21.

Further, the answer position calculating unit 44 extracts position information of each region on the educational material 20 which is recognized as the answer field 21 by the answer field information extracting unit 43. Specifically, for example, the answer position calculating unit 44 extracts information on x and y coordinates of a predetermined point (for example, an upper left apex of the circumscribed rectangle) of each region, which is the answer field 21, and information on a circumscribed rectangle of the region (for example, a width (W) and a height (H)), and uses them as position information items.

That is, the answer field information extracting unit 43 and the answer position calculating unit 44 serve as a position information extracting means of the invention for extracting the position information of each answer field 21 on the educational material 20.

The distributed point acquiring unit 45 specifies what points are distributed to the respective answer fields 21, on the basis of the layout analysis result obtained by the layout analyzing unit 41, the extraction result obtained by the distributed point information extracting unit 42, and the extraction result obtained by the answer field information extracting unit 43 and the answer position calculating unit 44. The specification is performed by associating the extraction result obtained by the distributed point information extracting unit 42 with the extraction result of the position information on each answer field 21 obtained by the answer field information extracting unit 43 and the answer position calculating unit 44. It is considered that the association is performed on the basis of the distance between the arrangement position of each answer field 21 and the arrangement position of each distributed point information item 24 in the same region, based on the layout analysis result. For example, the closest distances are associated with each other.

Further, the answer position/distributed point associating unit 46 creates information for specifying what points are distributed to the respective answer fields 21 on the educational material 20 in a data format suitable for the storage format of the database 1, on the basis of the extraction results obtained by the answer field information extracting unit 43 and the answer position calculating unit 44 and the association result obtained by the distributed point acquiring unit 45. The information created by the answer position/distributed point associating unit 46 is stored in the database 1 as the answer/distributed point correspondence information.

That is, the distributed point acquiring unit 45 and the answer position/distributed point associating unit 46 function as an answer/distributed point associating means of the invention for recognizing the points corresponding to the respective answer fields 21 on the educational material 20.

Next, a processing operation of the teaching material processing apparatus (including a case in which the teaching material processing apparatus is executed by a teaching material processing program) having the above-described structure, that is, the procedure of a teaching material processing method according to the invention will be described below.

When the teaching material processing apparatus is used, first, a process for storing the answer/distributed point correspondence information in the database 1 is performed. More specifically, the image reading unit 2 performs image reading on the original of the educational material 20, that is, the educational material 20 on which the answer fields 21 and the answerer information field 23 are entered at the end thereof and the determination of correct or incorrect answers is not entered therein. In this way, the teaching material processing apparatus acquires image data from the educational material 20. In addition, when the electronic data of the educational material 20 to be read is stored in the database 1, data obtained by rastering the electronic data stored in the database 1, not the image data acquired by the image reading unit 2, may be used. Further, when the electronic data is absent in the database 1, the following process may be performed by using the image data acquired by the image reading unit 2: the image data is stored in the database 1 as the electronic data for the educational material 20, and the image data is used when the subsequent point totaling process is performed.

Then, in the teaching material processing apparatus, the image data analyzing unit 3 performs an analyzing process on the image data for the educational material 20, and the distortion correcting unit 5 performs image distortion correction on the image data. The image distortion correction is performed to correct image distortion occurring when the image reading unit 2 performs image reading. Subsequently, the answer/distributed point correspondence information recognizing unit 12 performs answer/distributed point correspondence information recognition on the image data whose image distortion has been corrected by the distortion correcting unit 5.

Here, the recognition of the answer/distributed point correspondence information by the answer/distributed point correspondence information recognizing unit 12 will be described in detail.

First, the layout analyzing unit 41 performs layout analysis to recognize the answer/distributed point correspondence information. FIGS. 4A-D are diagrams illustrating an example of a layout analyzing process.

The layout analyzing unit 41 acquires a projection histogram of the image data to be processed on the vertical axis and the horizontal axis thereof, and performs region division by finding out a separator (a line segment for partitioning regions) or a white band region from the projection histogram. Then, the layout analyzing unit 41 repeatedly performs the region division to recognize the arrangement structure of each answer field 21 or distributed point information item 24 on the educational material 20. The image data to be processed is obtained by the image reading unit 2, and the image distortion of the image data is corrected by the distortion correcting unit 5. In addition, preferably, the image data is binarized. The binarization makes it possible to easily process the region division with high accuracy.

Figure 4A:
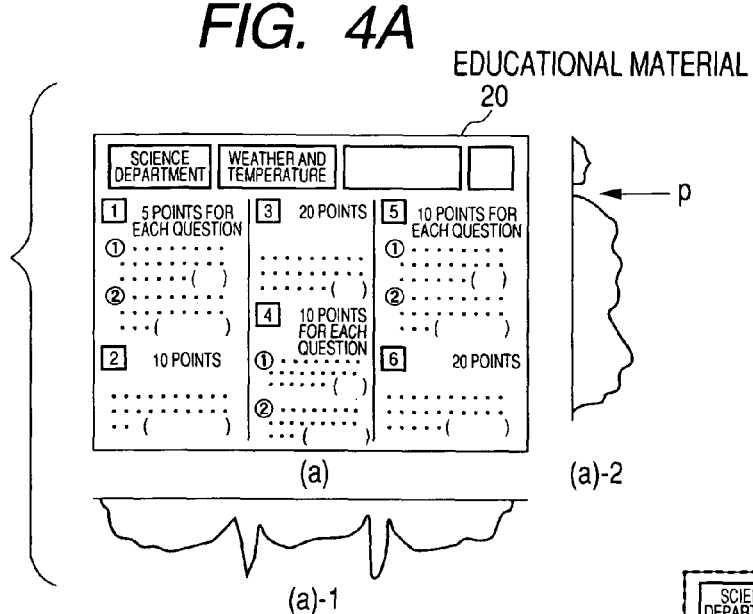
FIGS. 4A to 4D are diagrams illustrating an example of a layout analyzing process performed when the answer/distributed point correspondence information is recognized.
Figure 4B:
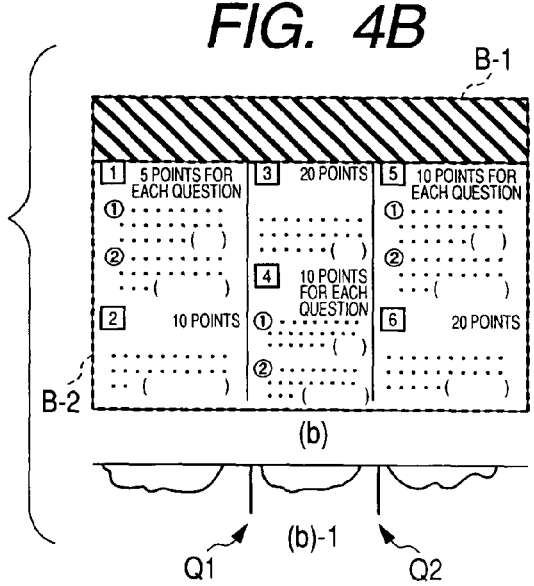
Figure 4C:
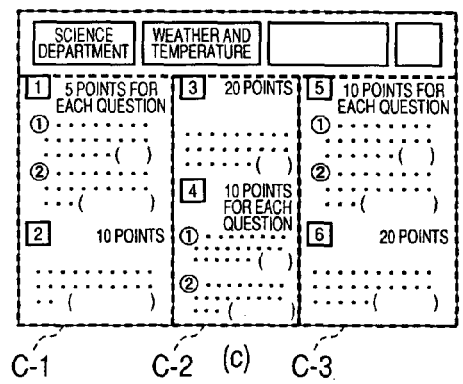
Figure 4D:
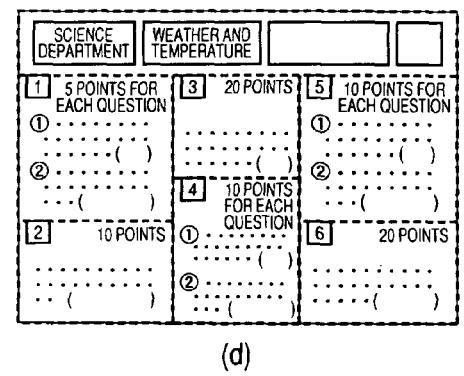

For example, as shown in FIG. 4A, when the projection histograms of an image A, which is obtained by binarizing the educational material 20, on the vertical axis and the horizontal axis are acquired, histograms (a)-1 and (a)-2 are obtained. Since discontinuity (frequency is '0') occurs at a place P in the histogram (a)-2 shown in FIG. 4A, this is determined as the white band region. Then, as shown in FIG. 4B, the educational material 20 is divided into two regions B-1 and B-2. When the projection histogram with respect to the region B-2 is acquired, a histogram (b)-1 is obtained. In addition, since the same result as that obtained when the educational material 20 is divided into the regions B-1 and B-2 is obtained in the vertical axis direction, it is not necessary to acquire the projection histogram in that direction. In FIG. 4B, since discontinuity (frequency is '0') occurs at places Q1 and Q2 and places having extremely high frequency occurs in the histogram (b)-1, these places are determined as separators. In this case, as shown in FIG. 4C, the region B-2 can be further divided into regions C-1, C-2, and C-3. In addition, when the region division is performed on each of the regions C-1, C-2, and C-3 using the same manner as described above, it is possible to perform the region division shown in FIG. 4D.

Figure 5A:
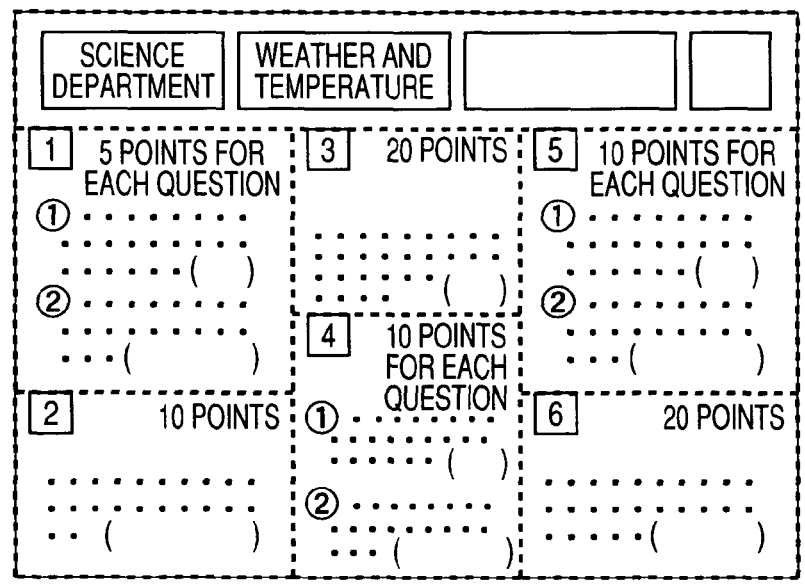
FIGS. 5A and 5B are diagrams illustrating an example of a distributed point information extracting process performed when the answer/distributed point correspondence information is recognized.
Figure 5A:
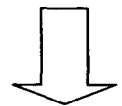
Figure 5B:
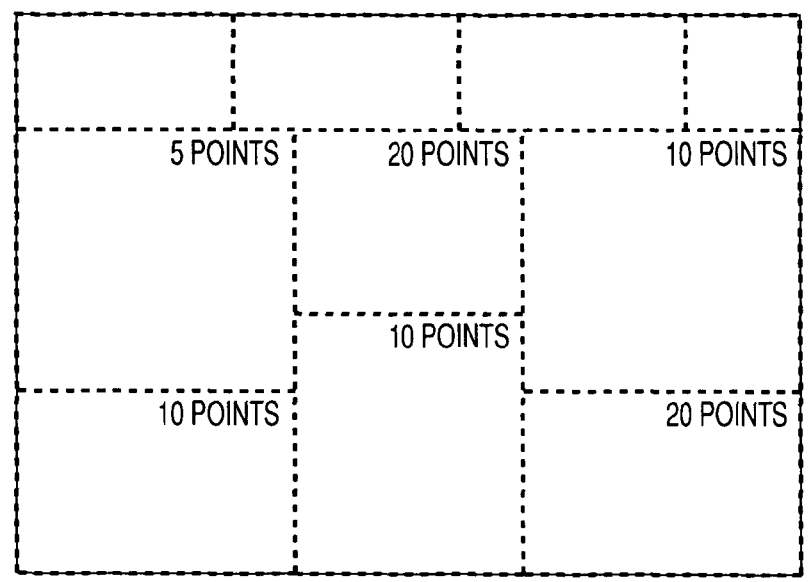

After the layout analyzing unit 41 performs the region division by layout analysis, the distributed point information extracting unit 42 performs the extraction of the distributed point information items 24. FIGS. 5A and 5B are diagrams illustrating an example of a distributed point information extracting process.

For example, when the layout analyzing unit 41 performs the layout analysis to obtain the region division results shown in FIG. 5A, the distributed point information extracting unit 42 extracts the distributed point information items 24 in the unit of the divided region. The extraction of the distributed point information items 24 may be performed by recognizing the characters existing in each region to extract a combination of characters 'figure' and 'points' (for example, characters '5 points' and '10 points'). In this way, for example, the extraction results of the distributed point information items 24 shown in FIG. 5B are obtained. In addition, when a plurality of distributed point information items 24 exists in one region, the plurality of distributed point information items 24 are all extracted.

Further, for the image data to be processed, the answer field information extracting unit 43 and the answer position calculating unit 44 extract the position information of each answer field 21 on the educational material 20. That is, the answer field information extracting unit 43 extracts a symbol having a predetermined shape, such as '( )' or '[ ]', by pattern matching, and recognizes a region specified from a circumscribed rectangle including the symbol as the answer field 21. In this case, when the symbol having a predetermined shape for specifying the answer field 21 is composed of a predetermined color component peculiar to the answer field 21, such as blue, in order to be easily discriminated from questions, it is considered that the answer field information extracting unit 43 recognizes, as the symbol specifying the answer field 21, only the symbol having the predetermined color component among the symbols having a predetermined shape that exist on the educational material 20. Then, when the answer field information extracting unit 43 performs recognition on the answer fields 21, the answer position calculating unit 44 extracts the position information of each region recognized as the answer field 21 by the answer field information extracting unit 43 on the educational material 20. For example, the answer position calculating unit 44 extracts information on x and y coordinates of a predetermined point (for example, an upper left apex of a circumscribed rectangle) of each region, which is the answer field 21, and information on the circumscribed rectangle of the region (for example, a width (W) and a height (H)), and uses them as position information items.

As such, the distributed point information extracting unit 42 extracts the distributed point information items 24, and the answer field information extracting unit 43 and the answer position calculating unit 44 extract the position information of the answer fields 21. Thereafter, the distributed point acquiring unit 45 and the answer position/distributed point associating unit 46 associate the respective extracted results.

Figure 6B:
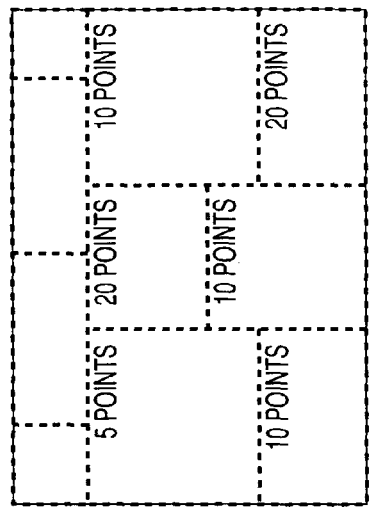
FIGS. 6A to 6C are diagrams illustrating an example of association when the answer/distributed point correspondence information is recognized.
Figure 6C:
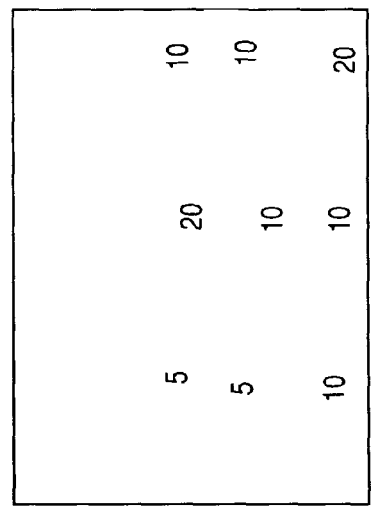
Figure 6A:
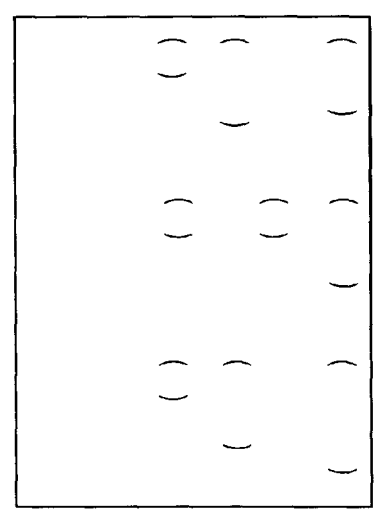

FIGS. 6A to 6C are diagrams illustrating an example of the association.

The association may be performed on the basis of, for example, a distance between the arrangement position of each answer field 21 (see FIG. 6A) and the arrangement position of each distributed point information item 24 (see FIG. 6B). For example, the closest distances are associated with each other. The distributed point information items 24 are arranged in the vicinities of the answer fields 21 such that a clear correspondence is made between the distributed point information items 24 and the answer fields 21 whose distribution of points is specified by the distributed point information items 24.

Figure 7:
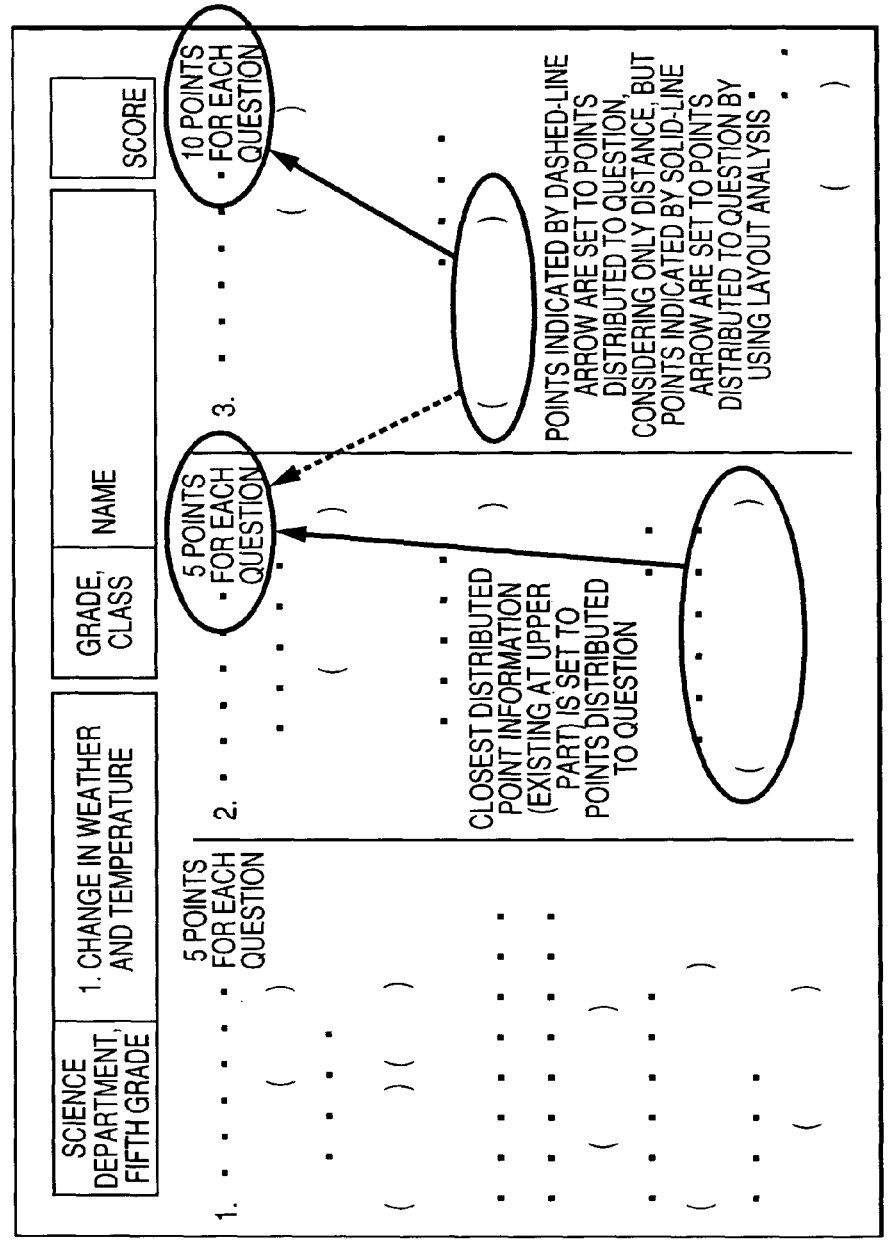
FIG. 7 is a diagram illustrating an example of an educational material for explaining results obtained by the association process.

Regions serving as the answer fields 21 on the educational material 20 are used as information on the points distributed to the answer fields 21, or they are specified by answer field position region information included in the electronic data of the educational material 20, similar to the distributed point information. FIG. 7 is a diagram illustrating an example of the answer field position region information. The answer field position region information is composed of question numbers existing on the educational material 20, points distributed to the answers of the questions, x and y coordinates of a predetermined point (for example, an upper left apex) of a region, serving as the answer field 21 where the answer to the question is entered, and a width W and a height H of a circumscribed rectangle thereof. As shown in FIG. 7, the answer field position region information is stored in the database 1 in a table form where these information items are associated with each other.

However, in a case in which the layout, such as multi-columns, exists on the educational material 20, when the association is performed on the basis of only the distance, correct association is not completely performed. For example, in FIG. 7, when the association is performed on the basis of only the distance, there is a fear that the association to be performed along arrows represented by solid lines will be performed along an arrow represented by a dashed line in FIG. 7.

Here, it is considered that the association of the position of each answer field 21 with each distributed point information item 24 is performed using the layout analysis result obtained by the layout analyzing unit 41 as follows.

For example, as shown in FIG. 6C, the distributed point information item 24 in the same region as that where the answer field 21 exists is considered as the distributed point information item 24 corresponding to the answer field 21, from the viewpoint of the distributed point information item 24 being obtained in a region unit. However, when a plurality of distributed point information items 24 exist in the same region, the corresponding distributed point information item 24 is determined on the basis of a predetermined regularity. The predetermined regularity is based on the distance between the distributed point information items or the position thereof (at least one side thereof or both sides thereof). More specifically, the distributed point information item arranged closest to the upper side of the answer field 21 is adopted according to the predetermined regularity. In addition, the predetermined regularity may be determined by the positional relationship between the distributed point information items, not by the distance therebetween. For example, when the distributed point information item 24 exists at the upper side of the region, the points positioned at the upper side are employed. On the other hand, when the distributed point information item 24 exists at the lower side of the region, the points positioned at the lower side are employed.

When the distributed point acquiring unit 45 performs the association, the answer position/distributed point associating unit 46 creates information for specifying what points are distributed to the respective answer fields 21 on the educational material 20 in a data format suitable for the storage format of the database 1, on the basis of the results obtained by the distributed point acquiring unit 45. Then, the information created by the answer position/distributed point associating unit 46 is stored in the database 1 as answer/distributed point correspondence information.

FIG. 8 is a diagram illustrating an example of the answer/distributed point correspondence information. The answer/distributed point correspondence information shown in FIG. 8 is composed of question numbers existing on the educational material 20, points corresponding to the answers of the questions, x and y coordinates of a predetermined point (for example, an upper left apex) of a region serving as the answer field 21 where the answer to the question is entered, and a width W and a height H of a circumscribed rectangle thereof. As shown in FIG. 8, the answer/distributed point correspondence information is stored in the database 1 in a table form where these information items are associated with each other.

Further, a process of storing the answer/distributed point correspondence information in the database 1 is preferably performed on the basis of the image data for the original of the above-mentioned educational material 20, from the viewpoint of the accuracy of information recognition. However, the process may be performed on the basis of the image data obtained from the educational material 20 in which the answer fields 21 and the answerer information field 23 are filled up and symbols indicating correct or incorrect answers are entered. In this case, the process can be performed as a portion of a point totaling process, which will be described later, which results in the improvement of processing efficiency.

Figure 9:
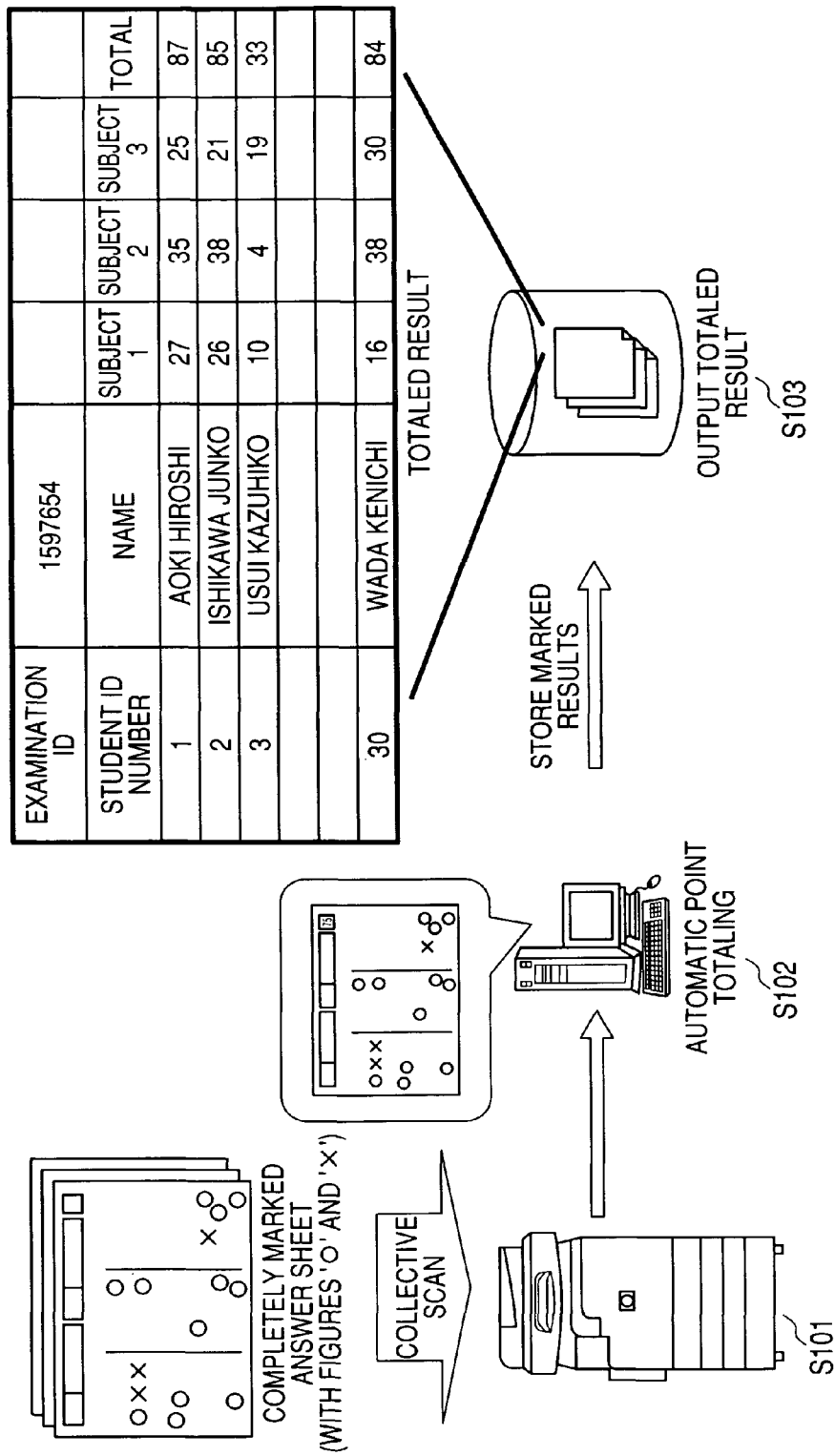
FIG. 9 is a diagram illustrating an example of a point totaling process performed by the teaching material processing apparatus according to the invention.

Subsequently, the point totaling process for the correct or incorrect answer determination entered in the educational material 20 will be described below. FIG. 9 is a diagram illustrating an example of the operation of the point totaling process in the teaching material processing apparatus according to the invention.

In the point totaling process, first, the image reading unit 2 performs image reading on the education material 20 in which, for example, a student enters his or her name in the answerer information field 23 and answers in the answer fields 21, and, for example, a teacher enters figures, such as 'O' and 'x', for determining whether the answers entered in the respective answer fields 21 are correct or incorrect, thereby obtaining image data from the educational material 20 (step 101; hereinafter, step is referred to as 'S'). In this case, when ADF is used, the image reading can be collectively performed on a plurality of educational materials 20 to be processed in a group unit, such as the same class, to continuously obtain image data from each educational material 20. Then, the image data obtained by the image reading is tentatively stored in, for example, a memory used as a work area.

Subsequently, the following automatic marking process is sequentially performed on the image data obtained from the respectively educational materials 20 (S102).

That is, the image data analyzing unit 3 performs an analysis process on the image data obtained from a certain educational material 20, and then the teaching material discriminating unit 4 performs discrimination specification on the educational material 20 on the basis of the analysis result. The discrimination specification may be performed by analyzing titles, such as 'science department', 'fifth grade', and '1. Change in weather and temperature', or by performing code analysis on code information embedded in the teaching material discriminating unit 4. The discrimination specification enables the teaching material discriminating unit 4 to specify the electronic data to be compared with the image data obtained by the image reading unit 2. In addition, it is also considered that the discrimination specification is sequentially performed on a plurality of educational materials 20 on which the image reading unit 2 has performed the image reading process. However, in general, since all educational materials 20 to be process in a group unit are the same, the discrimination specification may be performed on only the educational material 20 to be processed first in the group.

When the teaching material discriminating unit 4 specifies the electronic data, the database 1 extracts the corresponding electronic data from the data stored therein, on the basis of the specified result, and transmits it to the difference extracting unit 6.

Further, the distortion correcting unit 5 performs image distortion correct on the image data obtained from a certain educational material 20. The image distortion correction is performed for correcting the image distortion occurring when the image reading unit 2 performs the image reading to improve the accuracy of comparison with the electronic data or difference extraction to be performed in the subsequent process.

Then, the difference extracting unit 6 compares the electronic data transmitted from the database 1 with the image data which has been obtained by the image reading unit 2 and whose image distortion has been corrected by the distortion correcting unit 5, and then extracts the difference therebetween. The difference extraction causes the contents entered in the answerer information field 23 and each answer field 21 and the content corresponding to the correct or incorrect answer determination result for each answer field 21 to be extracted.

After the difference extracting unit 6 extracts the difference, the answerer extracting unit 7 specifies name information of the answerer to the educational material read out by the image reading unit 2 by a character recognition process on the difference. In this way, it is possible to specify the class, student ID number, and name of the answerer who has entered answers on a certain educational material 20.

Further, in order to extract the content corresponding to the correct or incorrect answer determination entered in each answer field 21, the correct/incorrect answer determination extracting unit 8 further extracts a predetermined color component, more specifically, a red component from the difference extraction result obtained by the difference extracting unit 6. When the difference extraction result is composed of pixel data, the extraction of a predetermined color component can be performed on the basis of color data constituting the pixel data.

However, in many cases, the entry of figures for determining correct or incorrect answers, such as 'O' or 'x', on the educational material 20 is generally performed overlapping the entry of answers in the respective answer fields 21 and frames for specifying questions and each answer field 21. Therefore, there is a fear that, according to the extraction result of a predetermined color component by the correct/incorrect answer determination extracting unit 8, a cut portion will occur in the overlapping portion, that is, in the figure 'O' or 'x'. For this reason, the disconnection correcting unit 9 performs a disconnection correcting process on the extraction result of a predetermined color component obtained by the correct/incorrect answer determination extracting unit 8.

Next, the disconnection correcting process performed by the disconnection correcting unit 9 will be described in detail.

Figure 10A:
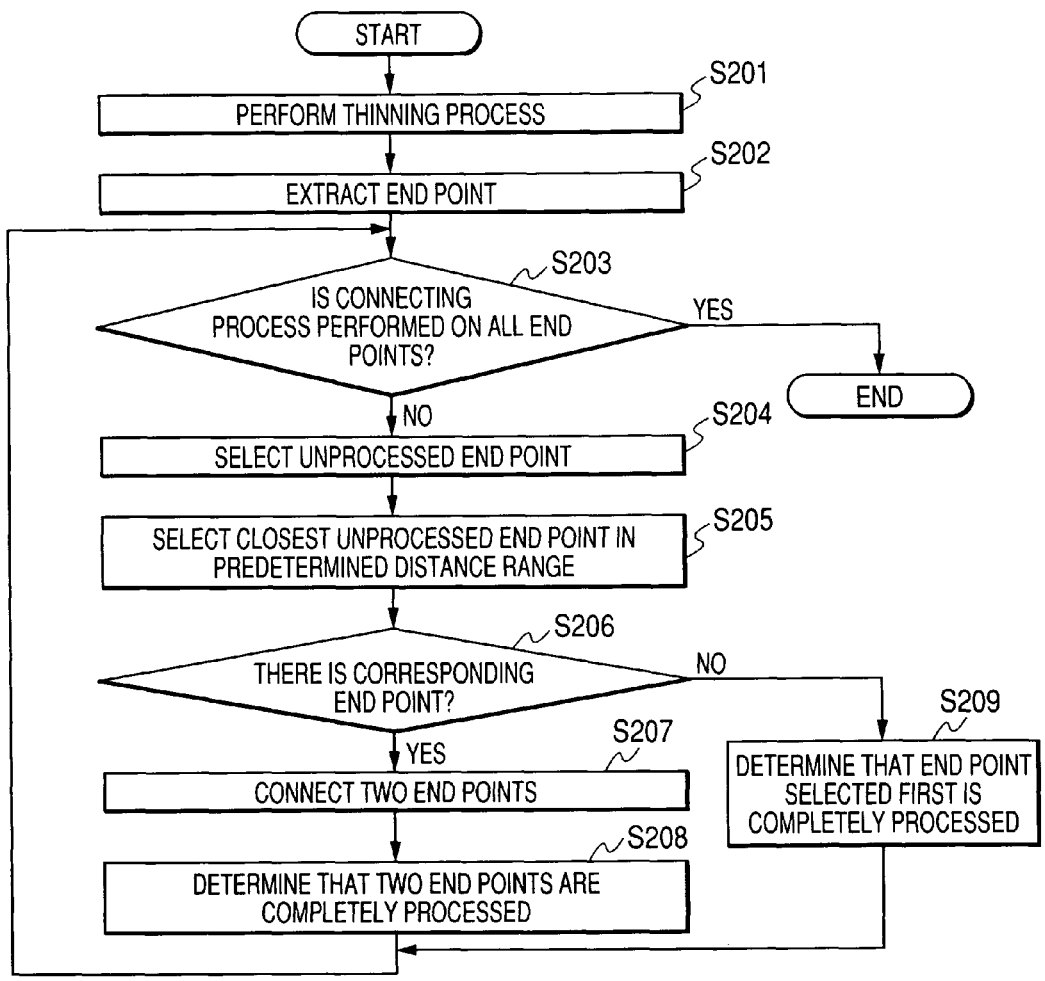
FIGS. 10A and 10B are diagrams illustrating an example of a disconnection correcting process.
Figure 10B:
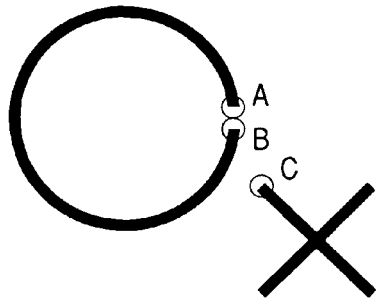

FIGS. 10A and 10B are diagrams illustrating an example of the disconnection correcting process.

As shown in FIG. 10A, in the disconnection correcting process, a thinning process is performed on the extraction result of a predetermined color component obtained by the correct/incorrect answer determination extracting unit 8, that is, the extraction result, such as a figure 'O' or 'x' (S201), and then an end point extracting process is performed thereon (S202). In this way, when a cutoff portion occurs in the figure 'O' or 'x', an endpoint of the cutoff portion can be extracted. In addition, the thinning process and the end point extracting process performed at that time may be performed by using a well-known technique, and thus a description thereof will be omitted.

Then, the following process is performed on all extracted end points (S203). That is, first, one unprocessed end point is selected (S204), and another unprocessed end point (hereinafter, referred to as a 'second end point') which is closest to the selected end point (hereinafter, referred to as a 'first end point') within a predetermined distance range (S205). Subsequently, when the second endpoint exists (S206), the first and second end points are connected to each other (S207), and the process on both the first and second end points is completed (S208). On the other hand, when the second point does not exist (S206), the connection between two end points is not performed, and the process on only the first end point is completed (S209). This process is performed on all end points until the unprocessed end points do not exist (S203 to S209).

In this way, in a case in which the figures shown in FIG. 10B are extracted, even when end points B and C exist in a predetermined distance range from an end point A, the end point B closest to the end point A is connected to the end point A, thereby correcting the cutoff portion in the figure 'O'.

Figure 11A:
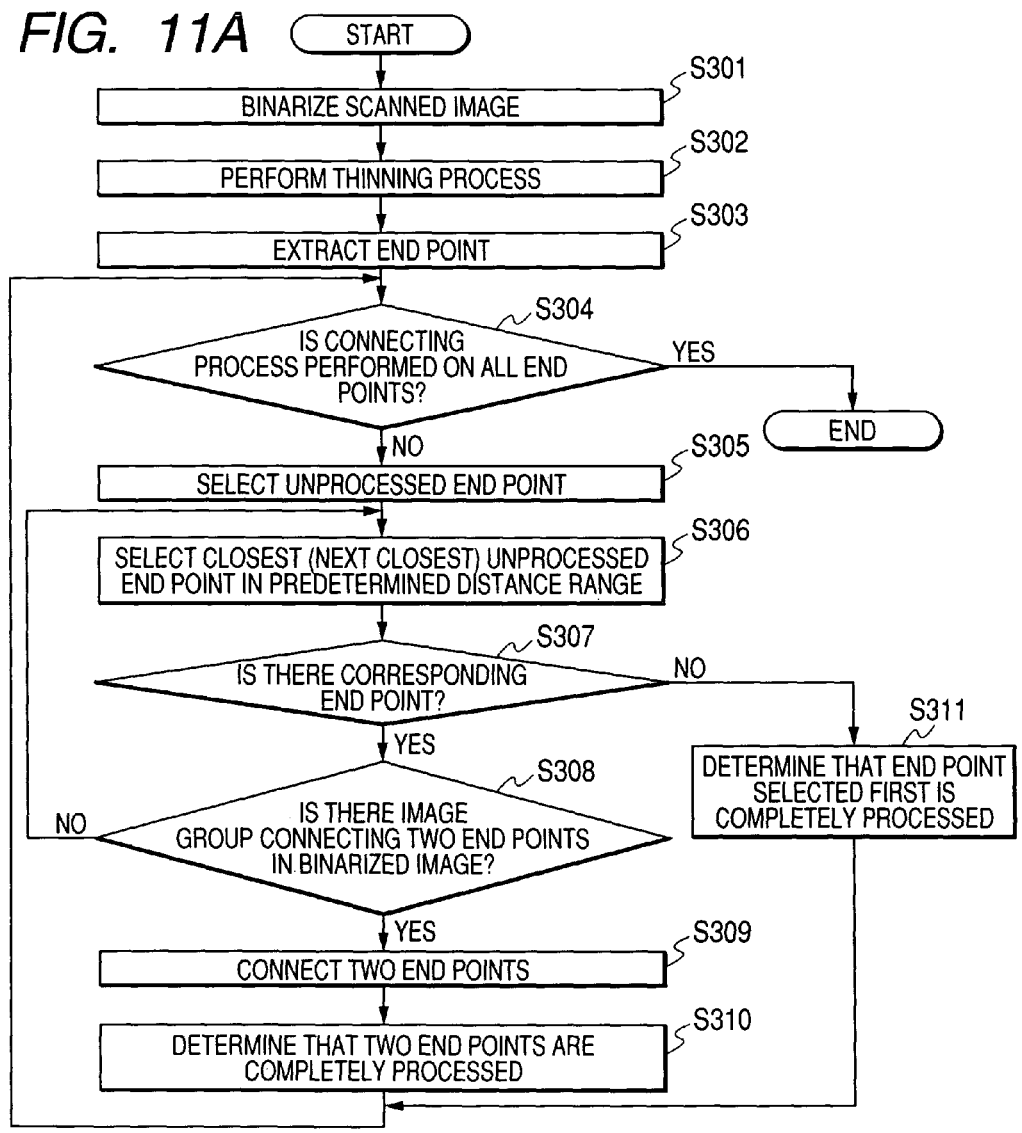
FIGS. 11A and 11B are diagrams illustrating another example of the disconnection correcting process.
Figure 11B:
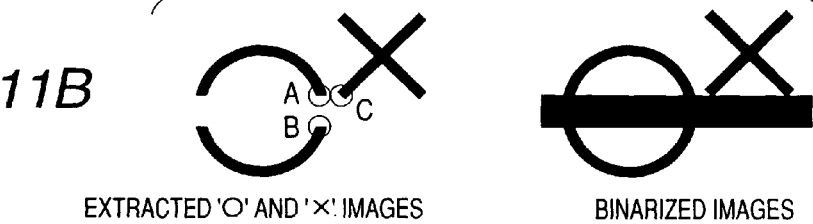

FIGS. 11A and 11B are diagrams illustrating another example of the disconnection correcting process.

In another example of the disconnection correcting process, the accuracy of the disconnection correcting process can be improved by using the image data whose image distortion has been corrected by the distortion correcting unit 5, other than the extraction result of a predetermined color component obtained by the correct/incorrect answer determination extracting unit 8. That is, in another example of the disconnection correcting process, as shown in FIG. 11A, a binarizing process is performed on the image data whose image distortion has been corrected by the distortion correcting unit 5 (S301). However, when the binarizing process is performed during the difference extraction by the difference extracting unit 6 or during the extraction of a predetermined color component by the correct/incorrect answer determination extracting unit 8, the binarized image data may also be used.

Further, a thinning process is performed on the extraction result of a predetermined color component obtained by the correct/incorrect answer determination extracting unit 8 (S302), and an endpoint extracting process is performed thereon (S303). Then, the following process is performed on all extracted end points (S304).

First, one unprocessed end point is selected as a first end point (S305), and another unprocessed end point closest to the selected first end point within a predetermined distance range is selected as a second end point (S306). Subsequently, when the second end point exists (S307), it is determined whether a group of pixels connecting the first and second end points exists in the binarized image data (S308). That is, it is determined whether an overlapping portion of images causing the disconnection exists. As a result, when the overlapping portion exists, the first and second end points are connected to each other (S309), and the process on both the first and second end points is completed (S310). On the other hand, when the overlapping portion does not exist, the process returns to S306 to select the second closest end point to the first end point in the predetermined distance range as a second end point. In this case, when an end point to be selected exists, the connection between two end points is not performed, and the process on only the first end point is completed (S311). This process is performed on all endpoints until the unprocessed end points do not exist (S304 to S311).

In this way, in a case in which the figures shown in FIG. 11B are extracted, when end points B and C exist in a predetermined distance range from an end point A, the end point C closest to the end point A is selected. However, since a group of pixels connecting the end points A and C does not exist in the binarized image data, the end points A and C are not connected to each other. Then, the end point B closest to the end point A next to the end point C is selected. In this case, since a group of pixels exists between the end point B and the end point A in the binarized image data, the end point B is connected to the end point A. That is, the figures 'O' and 'x' are not connected to each other, but a cutoff portion in the figure 'O' is corrected.

After the disconnection correcting unit 9 performs the disconnection correcting process, the figure shape recognizing unit 10 performs figure shape recognition on the content entered to determine the correct or incorrect answer, that is, performs pattern matching with the figure 'O' or 'x' to recognize whether the entered correct/incorrect answer determining content is a 'correct answer' or an 'incorrect answer'. The pattern matching performed at that time may be executed by a well-known technique, and thus a description thereof will be omitted.

Alternatively, the feature amount of a figure to be recognized may be calculated, and the shape of the figure may be recognized from the feature amount. The feature amount includes, for example, well-known items, such as the number of spots and the area ratio of a target figure to a circumscribed rectangle, and a detailed description thereof will be omitted in the invention.

After the figure shape recognizing unit 10 performs the figure shape recognition on the entered correct/incorrect answer determining content, the entry position recognizing unit 11 recognizes the entry position of the correct/incorrect answer determining content on the educational material 20. In addition, when the figure shape recognizing unit 10 performs the figure shape recognition, a group of pixels constituting the figure 'O' or 'x' is treated in a unit. Therefore, identifiers are not given to the group of pixels, but a labeling process, which is a general image processing technique, is performed. Thus, even when the entry position recognizing unit 11 performs the position recognition, a group of pixels constituting the figure 'O' or 'x' is treated in a unit by using the result obtained from the labeling process.

Figure 12:
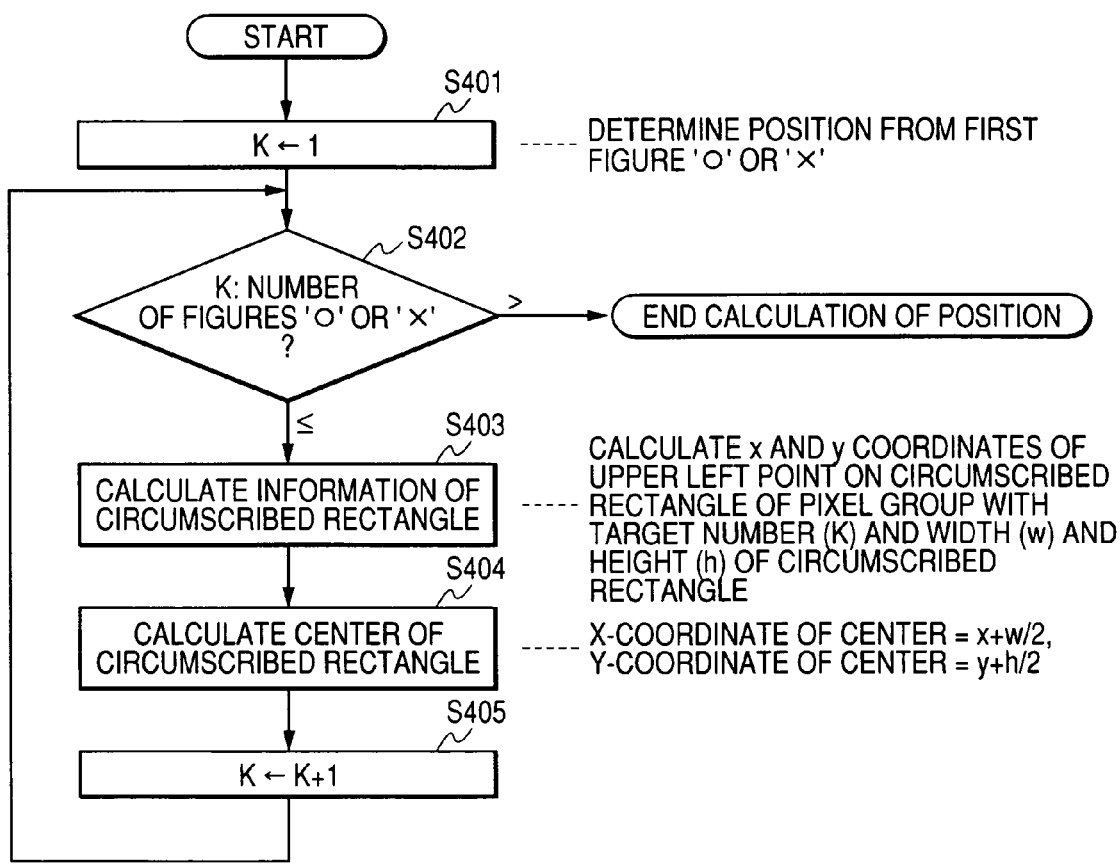
FIG. 12 is a flow chart illustrating an example of a process of recognizing the entry position of correct/incorrect answer determining contents.

Hereinafter, a process of recognizing a correct/incorrect answer determination entry position by the entry position recognizing unit 11 will be described in detail. FIG. 12 is a flow chart illustrating an example of the recognition procedure of the correct/incorrect answer determination entry position.

In the process of recognizing the correct/incorrect answer determination entry position, when a plurality of correct/incorrect answer determining contents are entered in the educational material 20, first, a count value K for correct/incorrect answer determination is set to '1' (S401) Until the count value K exceeds the number of correct/incorrect answer determining contents, that is, the number of answer fields 21 existing on the educational material 20 (S402), the positions of the correct/incorrect answer determining contents (the figures 'O' and 'x') detected in a predetermined scanning order are sequentially recognized from the first position.

For example, the position recognition may be performed by acquiring information on a circumscribed rectangle of the figure 'O' or 'x' (S403) and by calculating coordinates of the center of the circumscribed rectangle (S404). More specifically, the circumscribed rectangle of a figure to be recognized (a group of pixel) is extracted, and x and y coordinates of a predetermined point (for example, an upper left apex) on the circumscribed rectangle and a width W and a height H of the circumscribed rectangle are calculated. From the calculated results, the following x and y coordinates are calculated: an x-coordinate of the center=x+w/2, and a y-coordinate of the center=y+h/2. The calculated results are used as the positions of a group of pixels, that is, the recognition results of the correct/incorrect answer determination entry positions.

This process is repeatedly performed until all correct/incorrect answer determining contents existing on the educational material 20 are recognized (S402 to S405) while incrementing the count value K (S405).

After the entry position recognizing unit 11 recognizes the correct/incorrect answer determination entry position in this way, the point totaling unit 13 totals the correct/incorrect answer determination results. In this case, the point totaling unit 13 performs the point totaling on the basis of the recognition result of the entered correct/incorrect answer determining content obtained by the figure shape recognizing unit 10, the recognition result of the correct/incorrect answer determination entry position obtained by the entry position recognizing unit 11, and the answer/distributed point correspondence information stored in the database 1.

Further, the entry of the correct/incorrect answer determining content is generally performed corresponding to each answer field 21 on the educational material 20. However, since a teacher enters the correct/incorrect answer determining content by hand, the entry position of the correct/incorrect answer determining content in each answer field 21 is not necessarily determined uniformly.

Meanwhile, in the point totaling of the correct/incorrect answer determining contents, it is necessary to make a clear correspondence between each answer field 21 and the entry position of the correct/incorrect answer determining content. The point totaling of the correct/incorrect answer determining contents is performed on the basis of the points distributed to the respective answer fields 21 and the correct/incorrect answer determining contents (indicating a correct answer or an incorrect answer) after making the entered correct/incorrect answer determination result corresponding to each answer field 21 clear.

From this viewpoint, the point totaling unit 13 performs the point totaling of the correct/incorrect answer determining contents in the following procedure. That is, the point totaling unit 13 calculates an overlapping area between the circumscribed rectangle of a correct/incorrect answer determining figure, such as 'O' or 'x', and a region serving as the answer field 21 on the educational material 20, and associates the answer field 21 with a correct/incorrect answer determining figure having the largest area (which is similarly applied to an area ratio with respect to the circumscribed rectangle). Then, the correct/incorrect answer determining figure is used as the correct/incorrect answer determination result entered in the corresponding answer field 21. However, when an area ratio with respect to the circumscribed rectangle of the overlapping area is smaller than a predetermined threshold value, it is determined that the determination of association is unavailable since the overlapping area is small. After the association, when the correct/incorrect answer determining figure is 'O', the distribution of points specified from distributed point information is added to the corresponding answer field 21. On the other hand, when the correct/incorrect answer determining figure is 'x', the distribution of points is not added to the corresponding answer field 21, but the point totaling is performed on all answer fields 21 on the educational material 20. In addition, regions corresponding to the answer fields 21 on the educational material 20 may be specified by answer field position region information on the respective answer fields 21.

Figure 13:
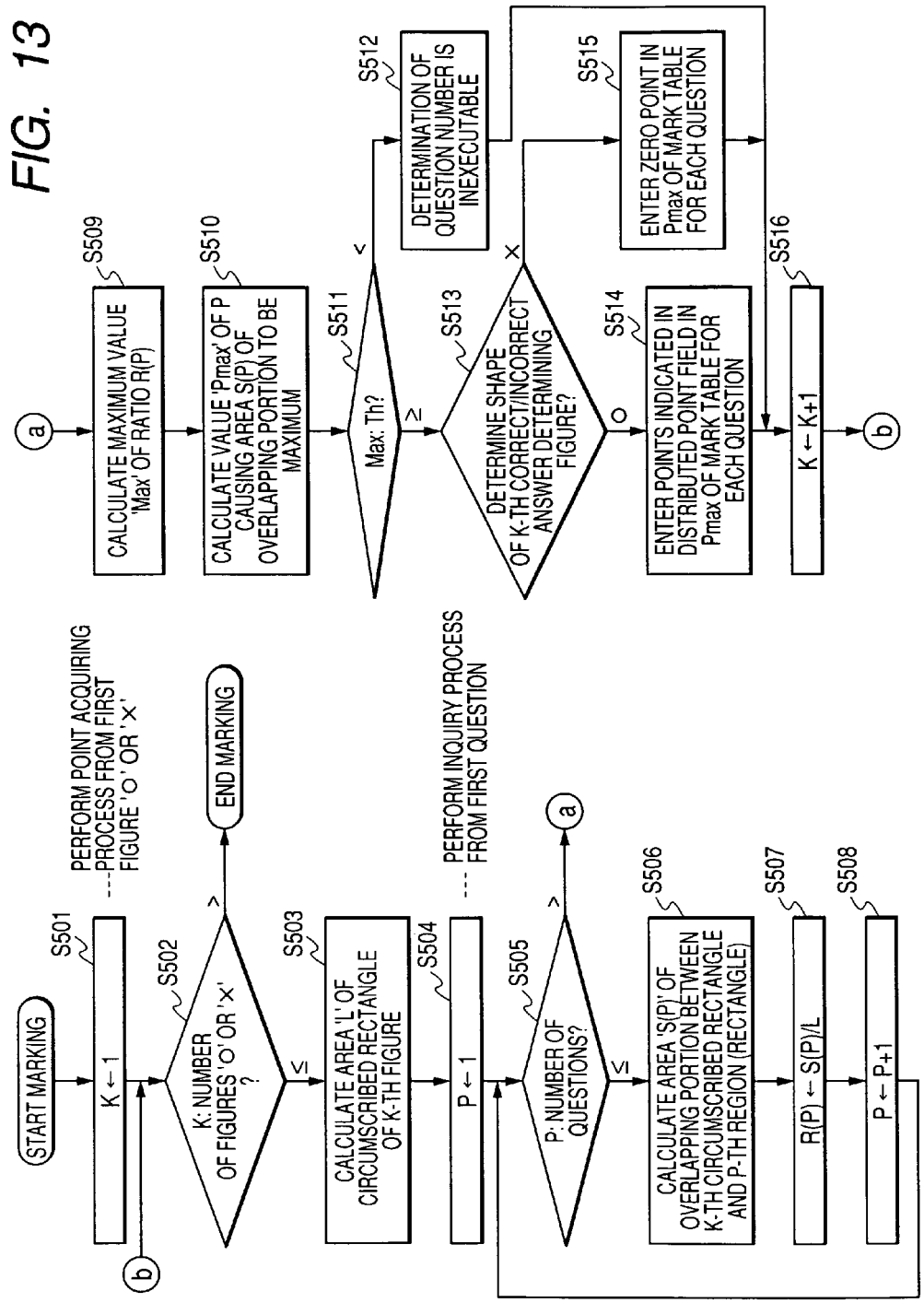
FIG. 13 is a flow chart illustrating an example of a point totaling process of the correct/incorrect answer determining contents.

Next, the point totaling of the correct/incorrect answer determining contents by the point totaling unit 13 will be described in detail. FIG. 13 is a flow chart illustrating an example of a point totaling procedure for the correct/incorrect answer determining content.

In the point totaling of the correct/incorrect answer determining contents, when a plurality of correct/incorrect answer determining contents is entered in the educational material 20, first, the count value K for the correct/incorrect answer determination is set to '1' (S501). Until the count value K exceeds the number of correct/incorrect answer determining contents, that is, the number of answer fields 21 existing on the educational material 20 (S502), the point totaling process is sequentially performed on the correct/incorrect answer determining contents (the figures 'O' and 'x') detected in a predetermined scanning order from the first position.

That is, the area of the circumscribed rectangle of a K-th figure 'O' or 'x' is calculated, and the calculated area is referred to as a letter 'L' (S503). In addition, a count value P for the number of answer fields 21 (the number of questions) is set to '1' (S504). When the count value P is smaller than the number of questions existing on the educational material 20 (S505), the count value P is acquired as the answer field position region information on the answer field 21. Then, an overlapping area between a K-th circumscribed rectangle and a P-th region is calculated, and the calculated result is referred to as 'S(P)' (S506). Further, the ratio of the area S(P) of the overlapping portion to the area L of the circumscribed rectangle is calculated, and the calculated result is referred to as 'R(P)' (S507). This process is repeatedly performed until all answer field position region information items are completely processed (S505 to S508) while incrementing the count value P (S508).

Then, the maximum value of the ratio R(P) is calculated, and is referred to as 'Max' (S509). Subsequently, the count value P causing the overlapping area S(P) to be maximum is calculated, and is referred to as 'Pmax' (S510). When the maximum value Max is smaller than a predetermined threshold value Th (S511), it is determined that the association of the correct/incorrect answer determining figure with the answer field 21 is unavailable, so that the question number corresponding to the correct/incorrect answer determining figure is not clearly recognized (S512). On the contrary, when the maximum value Max is larger than the predetermined threshold value Th (S511), it is determined whether a K-th correct/incorrect answer determining figure is 'O' or 'x' (S513) As a result, when the K-th figure is 'O', the distribution of points corresponding to the answer to a question having the count value Pmax is added in a 'mark result per question', which will be described later (S514). On the other hand, when the K-th figure is 'x', the distribution of points corresponding to the answer to the question having the count value Pmax is not added, but the K-th figure is considered to as a 'zero point' (S515).

Then, this process is repeatedly performed until all correct/incorrect answer determining contents are completely processed (S502 to S515) while incrementing the count value K (S516).

These processes cause the totaled result of the correct/incorrect answer determining contents entered in the educational material 20 to be output from the point totaling unit 13 as the mark result per question. FIG. 14 is a diagram illustrating an example of the mark result per question. The mark result per question is information composed of the question number existing on the educational material 20, the correct/incorrect answer determining content with respect to an answer to the question, and points obtained based on the correct/incorrect answer determining content. As shown in FIG. 14, the mark result per question is output from the point totaling unit 13 in a table format in which these components are associated with each other.

When the mark result per question is output from the point totaling unit 13, the totaled result output unit 14 associates the mark result per question, that is, the totaled result obtained by the point totaling unit 13 with the answerer information extracted by the answerer extracting unit 7, and then output it to the database apparatus 31 or the file server apparatus 32 connected to the teaching material processing apparatus (S103 in FIG. 9). In this way, the database apparatus 31 or the file server apparatus 32 can manage or use the point totaled results for the educational material 20 in the form of a list, for example.

As described above, in the teaching material processing apparatus, the teaching material processing method, and the teaching material processing program according to the invention, the image data read out from the educational material 20 having the correct/incorrect answer determining contents entered therein is compared with the electronic data of the educational material 20, that is, data of the educational material 20 in which answers are not entered in the answer fields 21 and the correct/incorrect answer determining contents for the answers are not entered, and the correct/incorrect answer determining contents are recognized from the difference between these data. Then, point totaling is performed on the correct/incorrect answer determining contents. However, when image recording is performed on the educational material 20 having the correct/incorrect answer determining contents entered therein, automatic totaling is performed on the mark results of the entered correct/incorrect answer determining contents. As a result, a marking process can be easily performed on the educational material 20. Further, since the image data read out from the educational material 20 is used as basic data, a dedicated apparatus capable of realizing the above-described structure is not needed as long as a scanning function realized by, for example, a duplicating machine, a multifunction machine, or a scanner, and an information storing/processing function, an image processing function, and a calculating function included in a computer, such as a personal computer, are provided. In addition, since the image data read out from the educational material 20 is compared with the electronic data stored in the database 1, it is possible to secure sufficient generality with respect to educational materials when electronic data with respect to various educational materials 20 is stored in the database 1.

Further, in the teaching material processing apparatus, the teaching material processing method, and the teaching material processing program according to the invention, the distributed point information items 24 included in the educational material 20 are extracted from the image data read out from the educational material 20, and the position information on the answer fields 21 included in the educational material 20 is extracted therefrom. Then, the extracted results are associated with each other, thereby obtaining the answer/distributed point correspondence information for specifying the points distributed to each answer field 21. That is, the answer/distributed point correspondence information is obtained from the image data which is obtained by image reading, and is then stored in the database 1. Therefore, the stored data can be used for the subsequent point totaling process. Thus, for example, even when a plurality of questions and answer fields 21 corresponding thereto are arranged on the educational material 20 and different points are distributed to the questions, clear association can be made between the answer fields 21 and the points respectively distributed to the answer fields 21, which enables the point totaling unit 13 to reliably perform point totaling on the correct/incorrect answer determining contents. Accordingly, since the answer/distributed point correspondence information is extracted from the image data of the educational material 20, it is not necessary to enter distributed point information by hand prior to the point totaling. This can be absolutely similarly applied to the case in which the answer/distributed point correspondence information is obtained from the electronic data stored in the database 1, not from the image data obtained by the image reading.

That is, in the teaching material processing apparatus, the teaching material processing method, and the teaching material processing program according to the invention, even when the distributed point information items 24 are previously entered in the educational material 20 used in an educational institute by hand, an automatic point totaling process can be performed on the correct/incorrect answer determining contents, which makes it possible to easily perform mark management. Thus, the educational institute can smoothly perform the mark management with a high degree of convenience and reliability.

Further, in the teaching material processing apparatus, the teaching material processing method, and the teaching material processing program according to the invention, in the recognition of the answer/distributed point correspondence information, the association of the arrangement position of each answer field 21 with the arrangement position of each distributed point information item 24 on the educational material 20 is performed on the positions of them and the distance therebetween. That is, for example, a process of recognizing the points distributed to each answer field 21 is performed on the basis of the closest distributed point information item 24. Therefore, the invention can be appropriately applied to a general educational material 20 in which the distribution of points is specified by the distributed point information item 24 arranged in the vicinity of the answer field 21. Thus, it is possible to reliably perform the association of the correct/incorrect answer determining contents with the distribution of points required for the point totaling process, without increasing the processing load.

Furthermore, in the teaching material processing apparatus, the teaching material processing method, and the teaching material processing program according to the invention, layout analysis is performed on the image data, and region division is performed corresponding to multi-columns, thereby recognizing the answer/distributed point correspondence information. In addition, it is possible to appropriately correspond to the layout of, for example, the educational material 20, which makes it possible to sufficiently secure generality with respect to the educational material 20. Further, in this case, the recognition of the answer/distributed point correspondence information can be reliably performed through the layout analysis, which makes it possible to sufficiently secure reliability with respect to a marking process.

Moreover, in the teaching material processing apparatus, the teaching material processing method, and the teaching material processing program according to the invention, symbols having predetermined shapes, or some of the symbols having a predetermined color component are recognized as symbols for specifying the answer fields 21. Therefore, the answer fields 21 can be rapidly and reliably recognized from a general educational material 20, which makes it possible to prevent an increase in processing load.

As mentioned above, according to an aspect of the invention, the invention provides a teaching material processing apparatus, a teaching material processing method, and a teaching material processing program capable of easily performing a marking process on an educational material used in an educational institute without using dedicated components to the marking process, and thus of sufficiently securing generality for the educational material.

According to an aspect of the invention, a teaching material processing apparatus includes: a reading unit that performs image reading on an educational material having answer fields and information items on points distributed to the answer fields therein to obtain image data from the educational material; a distributed point information extracting unit that extracts the distributed point information items from at least one of the image data obtained by the image reading of the reading unit and electronic data for the educational material; a position information extracting unit that extracts position information on the answer fields from at least one of the electronic data for the educational material and the image data obtained by the reading unit; an answer/distributed point associating unit that associates a result extracted by the distributed point information extracting unit with a result extracted by the position information extracting unit to recognize the points distributed to each answer field; a storage unit that stores a result recognized by the answer/distributed point associating unit as answer/distributed point correspondence information; a correct/incorrect answer determination recognizing unit that recognizes correct/incorrect answer determining contents from the image data obtained from the reading unit in which answers are entered in the answer fields and the correct/incorrect answer determining contents are entered; and a point totaling unit that performs point totaling on the correct/incorrect answer determining contents entered in the educational material, on the basis of the answer/distributed point correspondence information stored in the storage unit and a result recognized by the correct/incorrect answer determination recognizing unit.

According to another aspect of the invention, a teaching material processing method includes: performing image reading on an educational material having answer fields and information items on points distributed to the answer fields to obtain image data from the educational material; extracting the distributed point information items at least one of from the image data and electronic data for the educational material; extracting position information on the answer fields from at least one of the image data and the electronic data; associating a result extracted in the distributed point information extracting step with a result extracted in the position information extracting step to recognize the points distributed to each answer field; storing a result recognized in the associating step as answer/distributed point correspondence information; recognizing correct/incorrect answer determining contents used for marking the answers from the image data; and performing point totaling based on the correct/incorrect answer determining contents, on the basis of the answer/distributed point correspondence information and a result of the recognizing step.

According to another aspect of the invention, a program product enables a computer to perform processing of image data from an educational material that has answer fields and information items on points distributed to the answer fields, wherein the computer is connected to an image reading apparatus for acquiring the image data by performing image reading on the educational material. The program product includes: software instructions for enabling the computer to perform predetermined operations; and a computer recordable medium bearing the software instructions; wherein the predetermined operations includes: performing image reading on the educational material to obtain image data, extracting the distributed point information items at least one of from the image data and electronic data for the educational material, extracting position information on the answer fields from at least one of the image data and the electronic data, associating a result extracted in the distributed point information extracting step with a result extracted in the position information extracting step to recognize the points distributed to each answer field, storing a result recognized in the associating step as answer/distributed point correspondence information, recognizing correct/incorrect answer determining contents used for marking the answers from the image data, and performing point totaling based on the correct/incorrect answer determining contents, on the basis of the answer/distributed point correspondence information and a result of the recognizing step.

According to another aspect of the invention, a teaching material processing apparatus, includes: a database unit that stores electronic data for an educational material having answer fields; a reading unit that performs image reading on the educational material in which answers are entered in the answer fields and correct/incorrect answer determining contents are entered to obtain image data from the educational material; a difference extracting unit that compares the electronic data stored in the database unit with the image data obtained by the reading unit to extract a difference therebetween; a correct/incorrect answer determination recognizing unit that recognizes the correct/incorrect answer determining contents from the difference extraction result obtained by the difference extracting unit; and a point totaling unit that performs point totaling on the correct/incorrect answer determining contents entered in the educational material, on the basis of a result recognized by the correct/incorrect answer determination recognizing unit.

Further, the embodiment of the invention has been described above, but the invention is not limited thereto. For example, the distortion correcting process or the disconnection correcting process may not be performed.

Figure 15:
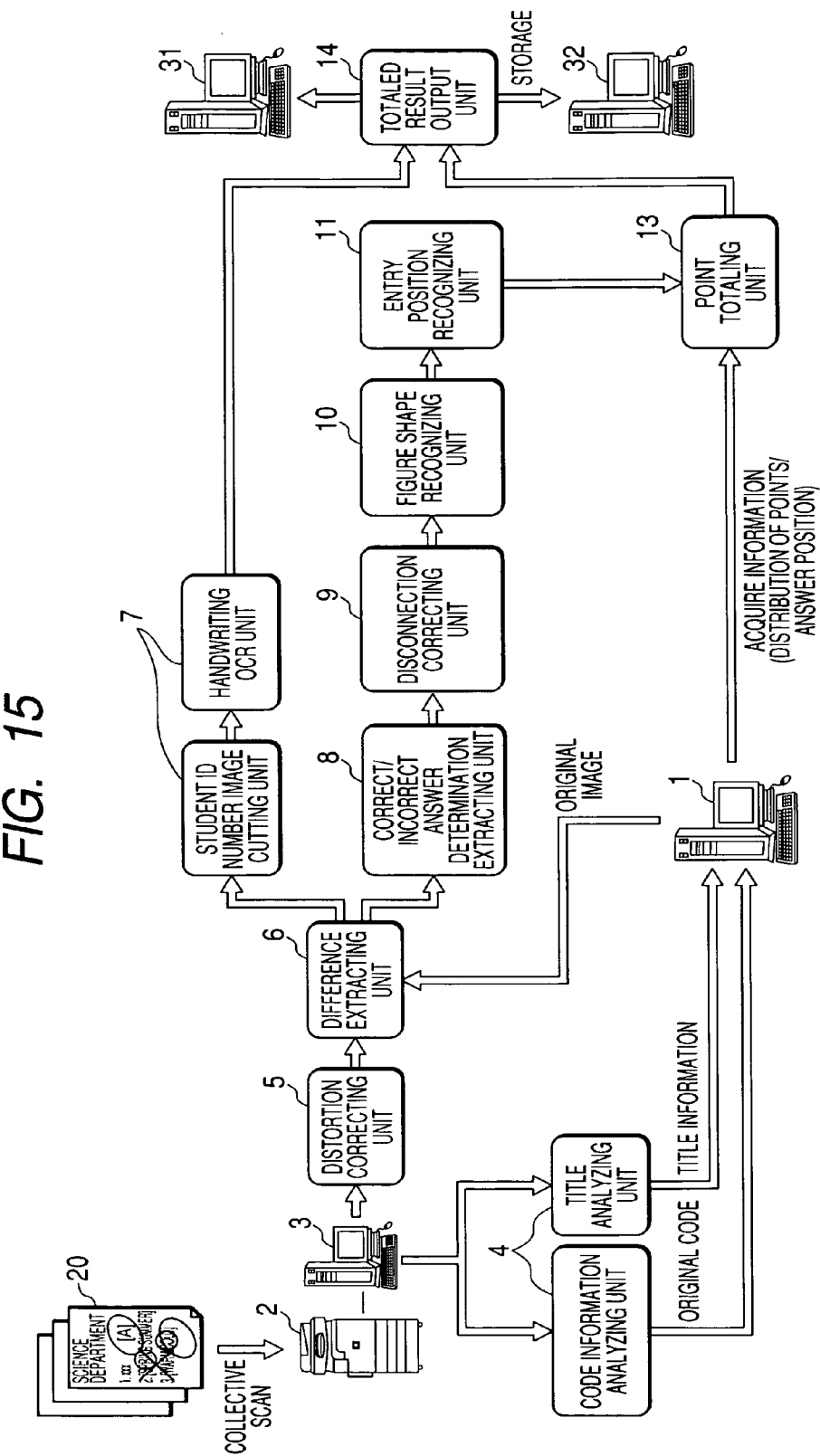
FIG. 15 is a block diagram illustrating the schematic structure of a teaching material processing apparatus according to the invention.

Further, as shown in FIG. 15, the answer/distributed point correspondence information recognizing unit 12 can be omitted.

Further, while the marking of test papers is done to enter the figure (◯) for a correct answer and the figure (x) for an incorrect answer in the embodiment as above, another figures may be used. For example, a check mark can be used for a correct answer.

In addition, various modifications and changes of the invention can be made without departing from the spirit and scope of the invention.

What is claimed is:

1. A material processing apparatus comprising:
a reading unit that reads image data of a material, the material having answer fields and distributed point information items on points distributed to the answer fields;
a layout analyzing unit that divides the image data read by the reading unit into a plurality of regions in accordance with at least one of an image object representing a separator in the image data and a white band region in the image data;
an answer/distributed point associating unit that associates, for each of the regions, one of the distributed point information items with at least one of the answer fields that exists in the same divided region;
a storage unit that stores a result recognized by the answer/distributed point associating unit as answer/distributed point correspondence information;
a correct/incorrect answer determination recognizing unit that recognizes correct/incorrect answer determining contents including an affirmative figure and a negative figure from the image data read by the reading unit, the affirmative figure indicating that an answer is correct and the negative figure indicating that an answer is incorrect, the affirmative figure and the negative figure being different in shape; and
a point totaling unit that performs point totaling on the correct/incorrect answer determining contents based on the answer/distributed point correspondence information.

2. The material processing apparatus according to claim 1, wherein
the answer/distributed point associating unit associates the answer fields with the extracted distributed point information items on the basis of position information, and the position information has a distance between a position of each answer field and a position of each distributed point information item or a positional relationship therebetween.

3. The material processing apparatus according to claim 1, wherein
a region including a symbol having a predetermined shape is recognized as one of the answer fields, and coordinate information on a predetermined point in the region and/or information on a circumscribed rectangle of the region are extracted as position information of the recognized answer field.

4. The material processing apparatus according to claim 3, wherein, among symbols having predetermined shapes on the material, a symbol having a predetermined color component is recognized as a symbol specifying the answer fields.

5. A material processing method comprising:
reading image data of a material, the material having answer fields and distributed point information items on points distributed to the answer fields;
dividing the image data into a plurality of regions in accordance with at least one of an image object representing a separator in the image data and a white band region in the image data;
associating, for each of the regions, one of the distributed point information items with at least one of the answer fields that exists in the same divided region;
storing a result of the recognized points distributed to each answer field as answer/distributed point correspondence information;
recognizing correct/incorrect answer determining contents including an affirmative figure and a negative figure from the image data, the affirmative figure indicating that an answer is correct and a negative figure indicating that an answer is incorrect, the affirmative figure and the negative figure being different in shape; and
performing point totaling on the correct/incorrect answer determining contents based on the answer/distributed point correspondence information.

6. A non-transitory storage medium readable by a computer, the storage medium storing a program of instructions executable by the computer to perform a function for processing a material, the function comprising:
reading image data of a material, the material having answer fields and distributed point information items on points distributed to the answer fields;
dividing the image data into a plurality of regions in accordance with at least one of an image object representing a separator in the image data and a white band region in the image data;
associating, for each of the regions, one of the distributed point information items with at least one of the answer fields that exists in the same divided region;
storing a result of the recognized points distributed to each answer field as answer/distributed point correspondence information;
recognizing correct/incorrect answer determining contents including an affirmative figure and a negative figure from the image data, the affirmative figure indicating that an answer is correct and a negative figure indicating that an answer is incorrect, the affirmative figure and the negative figure being different in shape; and
performing point totaling on the correct/incorrect answer determining contents based on the answer/distributed point correspondence information.

7. A material processing apparatus, comprising:
a database that stores electronic data;
a reading unit that reads data of a material to obtain image data from the material, the material having answer fields and distributed point information items on points distributed to the answer fields;
a difference extracting unit that compares the electronic data stored in the database with the image data obtained by the reading unit to extract a difference therebetween;
a layout analyzing unit that divides the image data read by the reading unit into a plurality of regions in accordance with at least one of an image object representing a separator in the image data and a white band region in the image data;
an answer/distributed point associating unit that associates, for each of the regions, one of the distributed point information items with at least one of the answer fields that exists in the same divided region;
a correct/incorrect answer determination recognizing unit that recognizes correct/incorrect answer determining contents including an affirmative figure and a negative figure from the difference extraction result obtained by the difference extracting unit, the affirmative figure indicating that an answer is correct and the negative figure indicating that an answer is incorrect, the affirmative figure and the negative figure being different in shape; and
a point totaling unit that performs point totaling on the correct/incorrect answer determining contents on the basis of a result recognized by the correct/incorrect answer determination recognizing unit.

8. The material processing apparatus according to claim 7, further comprising:
a discriminating unit that analyzes the image data obtained by the reading unit to specify the electronic data to be compared with the image data from the analyzed result.

9. The material processing apparatus according to claim 7, further comprising:
an answerer extracting unit that analyzes the image data obtained by the reading unit to extract information of an answerer as answerer information; and
a totaled result output unit that associates a mark totaled result obtained by the point totaling unit with answerer information extracted by the answerer extracting unit to output a result.

10. The material processing apparatus according to claim 7, wherein
the correct/incorrect answer determination recognizing unit recognizes a shape and an entry position of a figure used for marking correct/incorrect answers as the correct/incorrect answer determining contents.

11. The material processing apparatus according to claim 10, wherein
the point totaling unit makes the shape and entry position correspond to position information of the answer field and information on points distributed thereto of the electronic data stored in the database so as to perform point totaling on the basis of the correct/incorrect answer determining contents recognized by the correct/incorrect answer determination recognizing unit.

12. The material processing apparatus according to claim 7,
wherein, among difference extraction results obtained by the difference extracting unit, the correct/incorrect answer determination recognizing unit recognizes some of the results having a predetermined color component as the correct/incorrect answer determining contents.

13. The material processing apparatus according to claim 7, further comprising:
a disconnection correcting unit that performs a disconnection correcting process for connecting line segments extracted as the difference by the difference extracting unit so as to cause the correct/incorrect answer determination recognizing unit to recognize a shape used for marking the correct/incorrect answers.

14. The material processing apparatus according to claim 7, further comprising:
a distortion correcting unit that corrects the image distortion of the image data obtained by the reading unit to cause the difference extracting unit to extract the difference between the electronic data and the distortion-corrected image data.

15. A material processing method comprising:
storing electronic data;
reading data of a material to obtain image data from the material, the material having answer fields and distributed point information items on points distributed to the answer fields;
comparing the electronic data stored in a database with the image data obtained by the reading to extract a difference therebetween;
dividing the image data into a plurality of regions in accordance with at least one of an image object representing a separator in the image data and a white band region in the image data;
associating, for each of the regions, one of the distributed point information items with at least one of the answer fields that exists in the same divided region;
recognizing correct/incorrect answer determining contents including an affirmative figure and a negative figure based on the difference, the affirmative figure indicating that an answer is correct and a negative figure indicating that an answer is incorrect, the affirmative figure and the negative figure being different in shape; and
performing point totaling on the correct/incorrect answer determining contents.

16. A non-transitory storage medium readable by a computer, the storage medium storing a program of instructions executable by the computer to perform a function for processing a material, the function comprising:
storing electronic data;
reading data of a material to obtain image data from the material, the material having answer fields and distributed point information items on points distributed to the answer fields;
comparing the electronic data stored in a database with the image data obtained by the reading to extract a difference therebetween;
dividing the image data into a plurality of regions in accordance with at least one of an image object representing a separator in the image data and a white band region in the image data;
associating, for each of the regions, one of the distributed point information items with at least one of the answer fields that exists in the same divided region;
recognizing the correct/incorrect answer determining contents including an affirmative figure and a negative figure based on the difference, the affirmative figure indicating that an answer is correct and a negative figure indicating that an answer is incorrect, the affirmative figure and the negative figure being different in shape; and
performing point totaling on the correct/incorrect answer determining contents.

17. The material processing apparatus according to claim 1, wherein the correct/incorrect answer determination recognizing unit recognizes whether an answer based on a question posed is correct.

18. The material processing method according to claim 5, further comprising recognizing from the correct/incorrect answer determining contents whether an answer based on a question posed is correct.

19. The non-transitory storage medium according to claim 6, the function further comprising recognizing from the correct/incorrect answer determining contents whether an answer based on a question posed is correct.

20. The material processing apparatus according to claim 7, wherein the correct/incorrect answer determination recognizing unit recognizes whether an answer based on a question posed is correct.

21. The material processing method according to claim 15, further comprising recognizing from the correct/incorrect answer determining contents whether an answer based on a question posed is correct.

22. The non-transitory storage medium according to claim 16, the function further comprising recognizing from the correct/incorrect answer determining contents whether an answer based on a question posed is correct.

23. The material processing apparatus according to claim 1, wherein the layout analyzing unit finds at least one of the image object and the white band region in accordance with a projection histogram of the image data.

24. The material processing apparatus according to claim 1, wherein when a plurality of distributed point information items exist in the same region, the answer/distributed point associating unit associates the distributed point information item arranged closest to the upper side of an answer field in the same region with the answer field.

* * * * *